(12) United States Patent
Boyle

(10) Patent No.: US 12,064,922 B2
(45) Date of Patent: Aug. 20, 2024

(54) OPTIMALLY POSITIONING OBJECTS FOR ADDITIVE MANUFACTURING AND POST-PROCESSING

(71) Applicant: Fisher Controls International LLC, Marshalltown, IA (US)

(72) Inventor: Adam Boyle, Singapore (SG)

(73) Assignee: Fisher Controls International LLC, Marshalltown, IA (US)

( * ) Notice: Subject to any disclaimer, the term of this patent is extended or adjusted under 35 U.S.C. 154(b) by 1883 days.

(21) Appl. No.: 15/844,150

(22) Filed: Dec. 15, 2017

(65) Prior Publication Data

US 2019/0168305 A1  Jun. 6, 2019

(30) Foreign Application Priority Data

Dec. 5, 2017 (SG) .............................. 10201710089

(51) Int. Cl.
*B29C 64/386* (2017.01)
*B22F 3/24* (2006.01)
(Continued)

(52) U.S. Cl.
CPC .............. *B29C 64/386* (2017.08); *B22F 3/24* (2013.01); *B22F 10/28* (2021.01); *B22F 10/66* (2021.01);
(Continued)

(58) Field of Classification Search
CPC .. B29C 64/386; B29C 64/379; G05B 19/4099
See application file for complete search history.

(56) References Cited

U.S. PATENT DOCUMENTS

| 10,201,961 B2 * | 2/2019 | Zeng ....................... B33Y 30/00 |
| 10,620,611 B2 * | 4/2020 | Meess ................... B29C 64/386 |

(Continued)

FOREIGN PATENT DOCUMENTS

| CA | 2958945 | 3/2016 |
| CN | 105657210 | 6/2016 |

(Continued)

OTHER PUBLICATIONS

EOS, "Industrial 3D printing solutions," retrieved from [https://www.eos.info/en/videos] on May 10, 2018, 8 pages.
(Continued)

*Primary Examiner* — Xiao S Zhao
*Assistant Examiner* — Nicholas J Chidiac
(74) *Attorney, Agent, or Firm* — HANLEY, FLIGHT & ZIMMERMAN LLC

(57) ABSTRACT

Methods and apparatus for optimally positioning objects for automated machining are described herein. An example build file generator described herein includes an object file manager to identify a first toolpath volume associated with a first object to be formed via an additive manufacturing (AM) process. The first toolpath volume is based on a first toolpath of a first post-manufacturing process to be used on the first object. The object file manager is also to identify a second toolpath volume associated with a second object to be formed via the AM process. The second toolpath volume is based on a second toolpath of a second post-manufacturing process to be used on the second object. The example build file generator also includes a layout determiner to determine a layout of the first and second objects to be formed on a substrate by the AM process based on the first and second toolpath volumes.

19 Claims, 12 Drawing Sheets

(51) Int. Cl.

| | |
|---|---|
| *B22F 10/28* | (2021.01) |
| *B22F 10/66* | (2021.01) |
| *B22F 10/80* | (2021.01) |
| *B29C 64/153* | (2017.01) |
| *B29C 64/40* | (2017.01) |
| *B33Y 10/00* | (2015.01) |
| *B33Y 50/00* | (2015.01) |
| *G05B 19/4099* | (2006.01) |
| *B22F 10/47* | (2021.01) |

(52) U.S. Cl.
CPC ............ *B22F 10/80* (2021.01); *B29C 64/153* (2017.08); *B29C 64/40* (2017.08); *B33Y 10/00* (2014.12); *B33Y 50/00* (2014.12); *G05B 19/4099* (2013.01); *B22F 2003/247* (2013.01); *B22F 10/47* (2021.01); *G05B 2219/35123* (2013.01); *G05B 2219/35162* (2013.01); *G05B 2219/49023* (2013.01)

(56) References Cited

U.S. PATENT DOCUMENTS

| | | | |
|---|---|---|---|
| 10,800,155 B2* | 10/2020 | Zeng | ..................... B29C 64/386 |
| 2014/0350898 A1 | 11/2014 | Tschanz et al. | |
| 2016/0279879 A1 | 9/2016 | Zheng et al. | |
| 2017/0066195 A1* | 3/2017 | Chu | ........................ B33Y 10/00 |
| 2017/0113414 A1* | 4/2017 | Zeng | ..................... G05B 19/042 |
| 2017/0282458 A1 | 10/2017 | Matsuda et al. | |
| 2018/0253080 A1* | 9/2018 | Meess | .................... B29C 64/245 |
| 2019/0134970 A1* | 5/2019 | Zeng | ..................... G05B 19/042 |
| 2020/0233399 A1* | 7/2020 | Meess | .................... B29C 64/393 |

FOREIGN PATENT DOCUMENTS

| | | |
|---|---|---|
| CN | 105931296 | 9/2016 |
| WO | 2017023284 | 2/2017 |
| WO | 2017044892 | 3/2017 |
| WO | 2017055853 | 4/2017 |

OTHER PUBLICATIONS

Intellectual Property Office of Singapore, "Written Opinion", issued in connection with application No. 10201710089W dated Jun. 19, 2019, 7 pages.

Intellectual Property Office of Singapore, "Examination Report," issued in connection with Application No. 10201710089W, dated Jul. 12, 2020, 5 pages.

Intellectual Property Office of Singapore, "Search Report", issued in connection with Application No. 10201710089W dated Jul. 13, 2018, 3 pages.

International Searching Authority, "International Search Report and Written Opinion", issued in International Application No. PCT/US2018/062203 dated Mar. 19, 2019, 14 pages.

Intellectual Property Office of Singapore, "Written Opinion", issued in connection with application No. 10201710089W dated May 18, 2000, 6 pages.

* cited by examiner

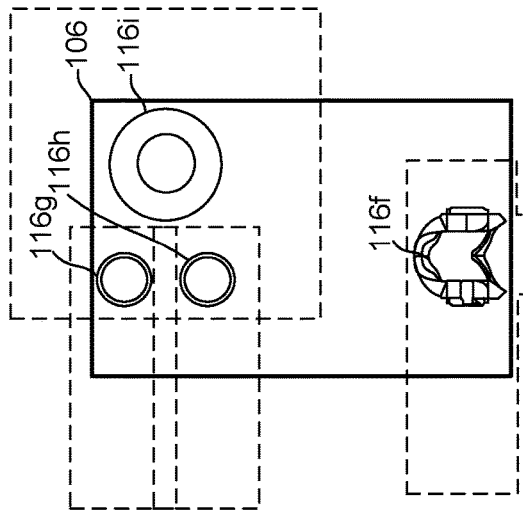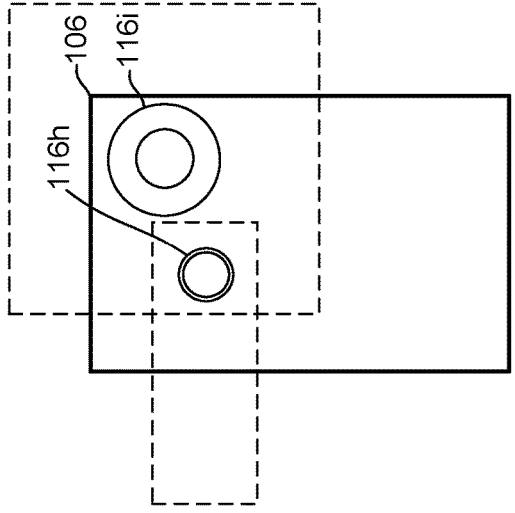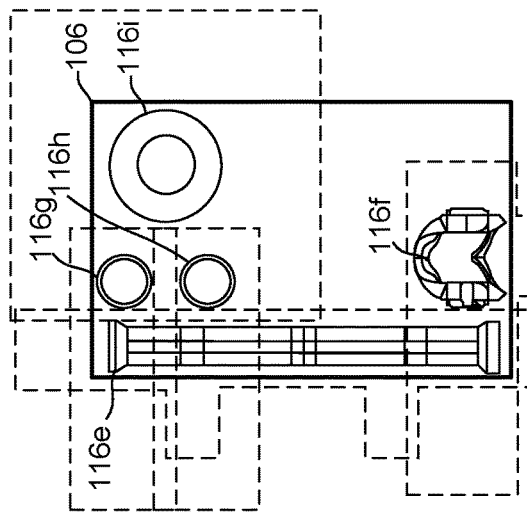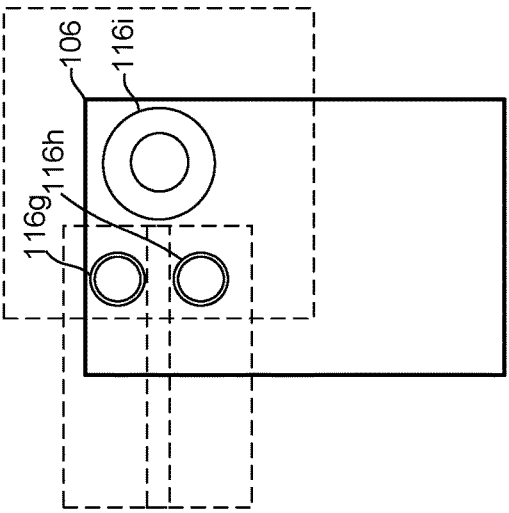

OPTIMALLY POSITIONING OBJECTS FOR ADDITIVE MANUFACTURING AND POST-PROCESSING

RELATED APPLICATION

This patent claims priority to Singapore Patent Application No. 10201710089 W, filed Dec. 5, 2017, and entitled "Methods and Apparatus for Optimally Positioning Objects for Automated Machining," which is hereby incorporated by reference in its entirety.

FIELD OF THE DISCLOSURE

This disclosure relates generally to automated machining and, more particularly, to methods and apparatus for optimally positioning objects for automated machining.

BACKGROUND

Additive manufacturing (AM), sometimes referred to as 3D printing, generally refers to a variety of processes that can be used to create a three-dimensional structure by adding layer-upon-layer of material to build the structure. Although the resolution of a structure produced by an AM machine is sometimes sufficient for a given application, one or more subtractive manufacturing processes (e.g., drilling, cutting, etc.) are often performed on the structure after the AM process to achieve greater precision in the structure.

SUMMARY

An example build file generator disclosed herein includes an object file manager to identify a first toolpath volume associated with a first object to be formed via an additive manufacturing (AM) process. The first toolpath volume is based on a first toolpath of a first post-manufacturing process to be used on the first object. The object file manager is also to identify a second toolpath volume associated with a second object to be formed via the AM process. The second toolpath volume is based on a second toolpath of a second post-manufacturing process to be used on the second object. The example build file generator also includes a layout determiner to determine a layout of the first and second objects to be formed on a substrate by the AM process based on the first and second toolpath volumes. According to the layout, the first object is at least partially disposed within the second toolpath volume.

An example method of producing objects disclosed herein includes building, via an additive manufacturing (AM) machine, a first object and a second object on a substrate according to a build file. The build file defines a layout of the first object and the second object on the substrate. According to the layout, the second object is at least partially disposed within a first toolpath volume associated with the first object. The first toolpath volume is based on a first toolpath for a first post-manufacturing process to be performed on the first object. The example method also includes removing the second object from the substrate and, after removing the second object from the substrate, performing, via a first post-manufacturing machine, the first post-manufacturing process on the first object while the first object is fixed on the substrate.

A non-transitory machine readable storage medium disclosed herein includes instructions that, when executed, cause at least one machine to at least identify a first toolpath volume associated with a first object to be formed via an additive manufacturing (AM) process, where the first toolpath volume is based on a first toolpath of a first post-manufacturing process to be performed on the first object, and identify a second toolpath volume associated with a second object to be formed via the AM process, where the second toolpath volume is based on a second toolpath of a second post-manufacturing process to be performed on the second object. The instructions, when executed, further cause the at least one machine to at least generate a build file for an AM machine based on the first toolpath volume and the second toolpath volume. The build file includes a layout of the first and second objects to be formed on a substrate by the AM machine.

BRIEF DESCRIPTION OF THE DRAWINGS

FIGS. 8A-8J illustrate an example sequence of post-manufacturing process(es) and removal of the example objects of FIGS. 6 and 7 that may be determined by the example build file generator of FIG. 1.

Figure 1:
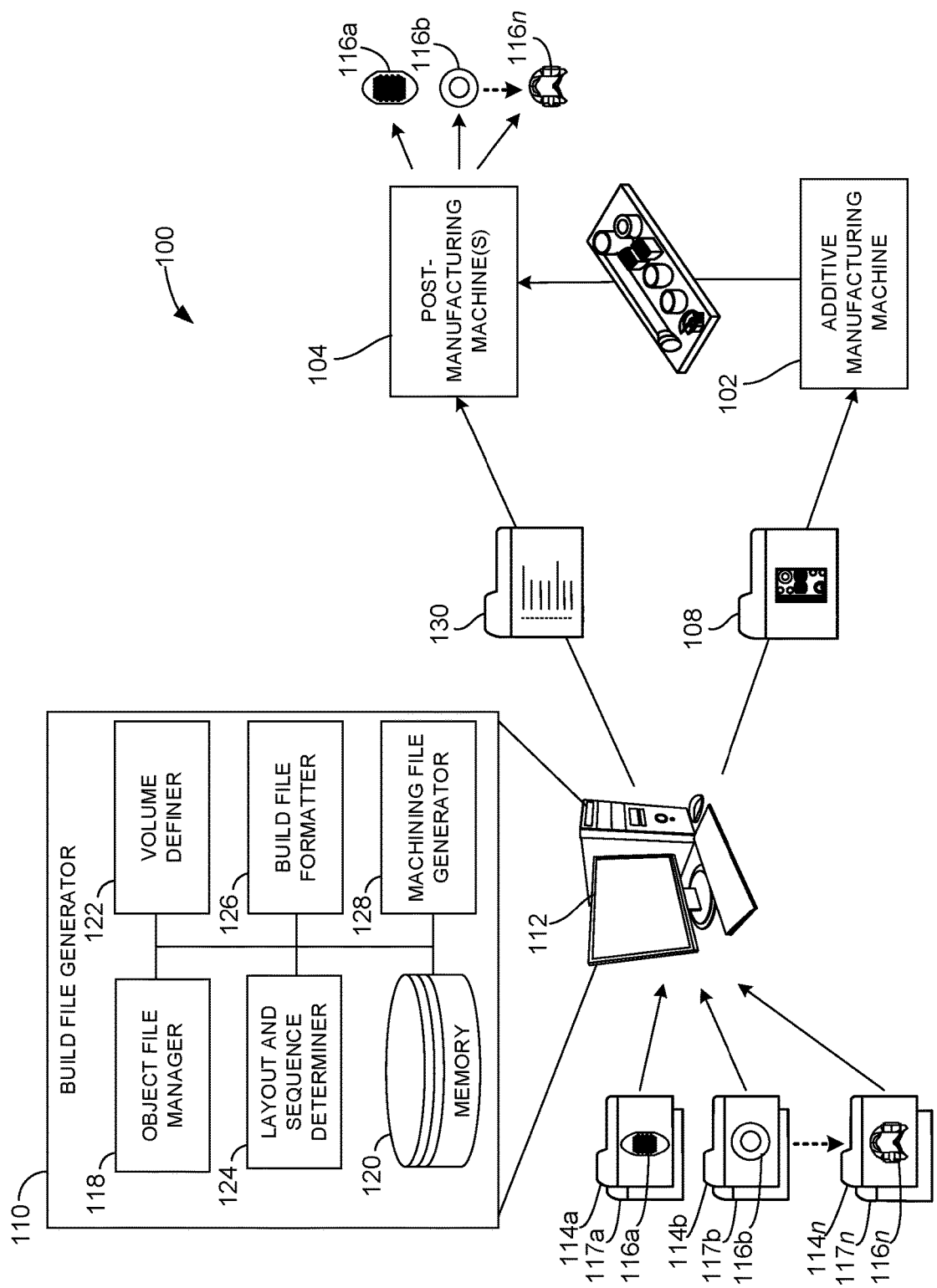
FIG. 1 illustrates an example build file generator, implemented in connection with an example automated machining system, to generate an example build file in accordance with the teachings of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Additive manufacturing (AM), sometimes referred to as three-dimensional (3D) printing, generally refers to a variety of manufacturing processes that can be used to create a three-dimensional object by adding layer-upon-layer of material to build the object. As used herein, the terms object, component, and part are defined to mean any 3D article that can be built via one or more machining processes, such as via an AM process. AM processes are now being used to create objects for almost any type of product, such as process control equipment (e.g., valves, regulators, sensors, etc.), vehicle parts, cellphone parts, etc. In some types of AM processes, such as powder bed fusion, the object is built on a substrate. As used herein, a substrate is defined to mean any piece of material (e.g., metal, plastic, etc.) upon which one or more objects may be built. With a powder bed fusion machine, for example, the object(s) is/are welded and/or otherwise coupled at its/their base to the substrate. After an object is built on the substrate, the object may be separated from the substrate.

In some examples, to achieve the necessary specifications or improve properties of the object such as, for example, surface quality, geometric accuracy, mechanical properties, etc., it may be desired or necessary to perform one or more post-manufacturing process(es) on the object. The terms "post-process," "post-manufacturing process," and/or variations thereof are used herein to mean any process that may be performed on an object after the general shape of the object has been formed (e.g., by an AM process). For example, one or more subtractive manufacturing processes (e.g., drilling, cutting, etc.) may be used to remove temporary support structures built during the AM process, to improve the surface resolution of the object, to create additional edges or openings, etc. Further, other post-manufacturing processes, such as, for example, de-powdering, cleaning, 3D scanning, painting, heat treating, shot peening, electrochemical treatment, etc., may be used to improve the mechanical and/or tactile properties of the surface of additively manufactured parts.

In some instances, it is beneficial to retain the object on the substrate while performing the one or more post-manufacturing process(es). For example, some objects may not have a suitable fixture point (e.g., because of their complex geometries) to fix the object to a machine for post-manufacturing processing. Thus, if the object is removed, an appropriate fixture point has to be added or an additional structure (which acts as a fixture point) has to be created on the object during the AM process. Also, fixing an object to a machine requires significant time and, thus, reduces cost efficiency.

To increase the efficiency of the AM process, it is often desired to build multiple objects on the substrate at the same time. The objects may be arranged in a relatively dense layout to fit as many objects on the substrate as possible, which increases (e.g., maximizes) the number of objects that can be produced in a single batch. Further, as mentioned above, one or more post-manufacturing process(es) are often desired or needed to finish the object(s). However, these post-manufacturing process(es) require room or space around the respective objects to accommodate the toolpaths of the respective post-manufacturing process(es). As such, the objects would need to be spaced apart from each other to accommodate the toolpaths of the post-manufacturing machines. However, increasing the spacing between the objects results in fewer objects being built on a common substrate and, thus, lowers the efficiency of the build processes. For example, while a high-density layout may maximize build efficiency, such a high-density layout often prevents a post-manufacturing process tool, such as a bit of a computer numeric control (CNC) machine, from accessing each object. In other words, the other objects on the build substrate may obstruct the toolpath of the post-manufacturing machine. While it may be possible to remove the objects from the substrate and post-process the objects individually, as explained above, individually fixing objects to post-manufacturing machine(s) is extremely time consuming, which reduces efficiency and productivity. Any increased efficiency and productivity gained through the use of a high-density layout may be lost to the inefficiencies introduced by individually post-processing each object of a batch.

Disclosed herein are example methods, apparatus, systems, and articles of manufacture for generating a build file or model that enables a high-density layout of objects while permitting the objects to be machined while the objects are still fixed to the substrate. The examples disclosed herein select a plurality of objects and determine an optimal layout of the objects to be built or formed on a common substrate based on toolpath volumes associated with the respective objects. As used herein, a "toolpath volume" means a volume around an object that a tool of a post-manufacturing machine occupies during a post-manufacturing process performed on the object and which is to be kept clear to avoid a collision with another object. Thus, a toolpath volume may be represented by, for example, a set of coordinates or distances relative to the object (e.g., relative to a center point of the object, relative to an edge or surface of the object, etc.) that define(s) one or more boundaries around the object.

An example build file generator disclosed herein analyzes a plurality of object files (representing objects to be built via an AM process) and machining files associated with the object files that define toolpath volumes around each of the objects. The example build file generator may select two or more objects (e.g., from a larger set of possible objects) and define a layout of the objects to be built on a common substrate using an AM machine based on the toolpath volumes associated with the objects. The example build file may be used by an AM machine to build the objects on the substrate according to the defined layout.

In some examples, the build file generator also determines a sequence of post-manufacturing process(es) and removal that is to be performed on the objects on the substrate. The sequence, which may be stored as a separate file (e.g., a machining file for the build) or included as part of the build file, defines an order in which the one or more post-manufacturing process(es) are to be performed on each of the objects and/or the sequence of removal of the objects. For example, a sequence may specify that (1) a first post-manufacturing process is to be performed on a first object and then the first object is to be removed, (2) a second post-manufacturing process (which may be the same or different as the first post-manufacturing process) is to be performed on a second object and then the second object is to be removed, and so forth. By using the example sequence, one or more of the objects may be positioned within (or partially within) a toolpath volume of another object because the example sequence ensures that the toolpath volume around each of the objects is clear before the post-manufacturing and/or removal of the next object(s) is/are initiated. For example, a layout may specify that a first object and a second object are to be built on a substrate where the first object is disposed within (or partially within) the toolpath volume of the second object. The sequence may specify that the one or more post-manufacturing process(es) that are to be performed on the first object are to be performed first, and then the first object is to be removed. Then, the one or more post-manufacturing process(es) that are to be performed on the second object can be performed, because the area around the second object (which was previously occupied by the first object) is now clear, and so forth. As a result, the objects can be arranged in a layout that increases (e.g., maximizes) the density of objects on the substrate, thereby decreasing the total build time of the objects and increasing efficiency of the machining process.

Thus, example methods, apparatus, systems, and articles of manufacture disclosed herein enable a high-density object layout on a substrate while permitting the objects to be machined while the objects are attached to the substrate. A high-density object layout reduces total production time required to produce a set of (e.g., two or more) objects, thereby increasing efficiency and productivity. Further, the example methods, apparatus, systems, and articles of manufacture solve the problem associated with performing post-manufacturing processes on a high-density object layout by using the toolpath volumes of each object and defining the layout and sequence of removal based on the toolpath volumes. Thus, the example methods, apparatus, systems, and articles of manufacture enable the objects to remain fixed to the substrate during the post-manufacturing processing. By obviating the need to remove each object from the substrate, individually fixing each object to the post-manufacturing machine(s), and individually machining each part, the examples disclosed herein further increase the efficiency and productivity of the manufacturing and post-manufacturing processes.

Turning now to the figures, FIG. 1 illustrates an example automated machining system 100 that may be used to manufacture one or more objects. The automated machining system 100 may be part of a machining or manufacturing facility (e.g., a 3D printing facility), for example, that receives work orders and produces the objects according the specifications of the work orders. In the illustrated example, the automated machining system 100 includes an additive manufacturing (AM) machine 102 that builds one or more objects via an AM process and one or more post-manufacturing machine(s) 104 that perform one or more post-manufacturing process(es) on the object(s) after being built by the AM machine 102. In the illustrated example, the AM machine 102 builds the one or more object(s) on a substrate 106 according to a build file 108 (sometimes referred to as a build model), which defines the shapes, boundaries, orientations, etc. of the object(s) to be built or formed (as disclosed in further detail herein). The example substrate 106 (with a plurality of example objects) is illustrated in FIG. 1 as being transferred from the AM machine 102 to the post-manufacturing machine(s) 104. After the object(s) are created on the substrate 106 by the AM machine 102, one or more post-manufacturing process(es) may be performed on the object(s), including removal of the object(s) from the substrate 106.

Figure 2:
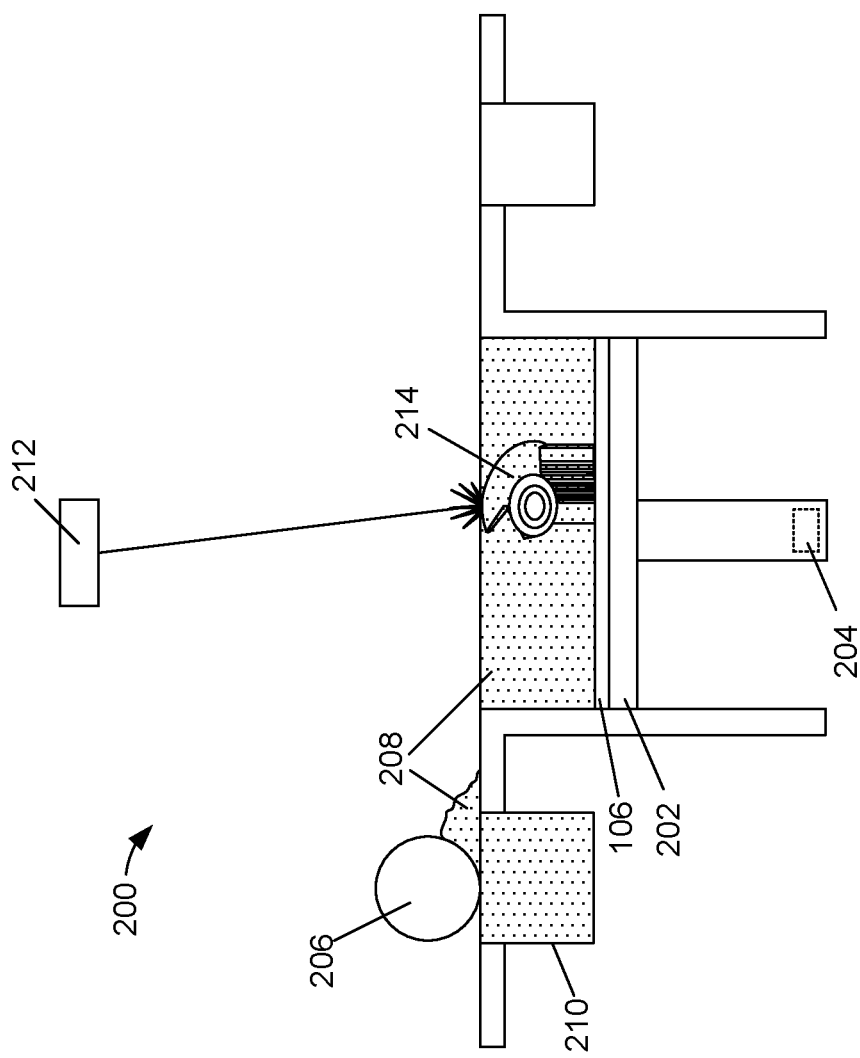
FIG. 2 illustrates an example additive manufacturing machine that may be implemented in the example automated machining system of FIG. 1 to build one or more objects according to an example layout defined by the example build file.

Referring briefly to FIG. 2, FIG. 2 illustrates an example powder bed fusion machine 200, which is a type of AM machine that may be implemented as the AM machine 102 of FIG. 1. The powder bed fusion machine 200 may be used to build one or more object(s) on a substrate, such as the substrate 106, according to a build file, such as the build file 108 (FIG. 1). The substrate 106 may be, for example, a metal plate. In the illustrated example, the powder bed fusion machine 200 includes a build platform 202 that is moveable up and down via a platform motor 204. To create one or more objects, the substrate 106 is placed on the build platform 202. Then, a roller 206 spreads a thin layer (e.g., 40 microns) of powder material 208 from a reservoir 210 (e.g., a hopper) over a top of the substrate 106 and the build platform 202. The powder material 208 may be any metal and/or polymer based material. Then, a laser 212 applies energy to the layer of powder material 208 (in the shape of a cross-section of the 3D object(s) according to the build file), which sinters, fuses, and/or otherwise hardens the powder material 208 to form a layer of the object(s). In this example, the first layer of the object(s) is/are welded to the substrate 106. Next, the build platform 202 is moved downward a small amount, (e.g., 0.1 millimeter (mm)) via the platform motor 204, and the roller 206 spreads another layer of the powder material 208 over the build platform 202 and over the first hardened layer(s). The laser 212 then applies energy to the powder material 208 to harden the material onto the previous layer(s). This process is repeated to build the object(s) layer-by-layer. An example object 214 is illustrated in FIG. 2, which is welded to the substrate 106.

The loose, unfused powder material 208 surrounding the object(s) on the build platform 202 remain in position throughout the process and is removed at the end (e.g., via a de-powdering unit). Other types of powder bed fusion AM processes may be completed by a variety of techniques such as, for example, direct metal laser sintering, electron beam melting, selective heat sintering, selective laser melting, selective laser sintering, etc. Powder bed fusion methods use either a laser or electron beam to melt and fuse material powder together. While some of the examples disclosed herein are described in connection with a powder bed fusion AM machine, the examples disclosed herein can likewise be implemented with any other type of AM process or machine, such as VAT photopolymerisation, material jetting, binder jetting, material extrusion, sheet lamination, and/or directed energy deposition.

Building objects with an AM machine, such as the powder bed fusion machine 200, requires significant time because the objects are built by creating thousands of thin layers of material (or even more). For example, an object having 10,000 layers may require several hours, or even days to produce. One of the major efficiency factors that contributes to the AM process time is the re-spreading process/time. Therefore, if multiple objects can be built next to each other at the same time, the total number of respreads that would otherwise be needed is greatly reduced (as compared to building multiple objects at separate times), because the cross-sections of multiple objects can be created using the same spread. Thus, it is often desirable to select a set of objects and position the selected objects in a high-density layout on the substrate 106. Increasing the density of a layout is one way to maximize the number of objects that can be produced in a single batch, thereby reducing the number of batches needed to produce a set of objects.

However, after the object(s) are built via the AM process, one or more post-manufacturing process(es) are often needed or desired to finish the respective object(s) according to a desired specification. For example, an object may be built with one or more temporary support structures within openings or arches of the object. After building the object, the temporary support structures are to be removed. Further, one or more processes may be desired to smooth the surface(s) of the object (because of the potentially rough (non-smooth) surface texture created via the AM process). Thus, one or more post-manufacturing process(es) may need or be desired to be performed on the object(s).

Figure 3:
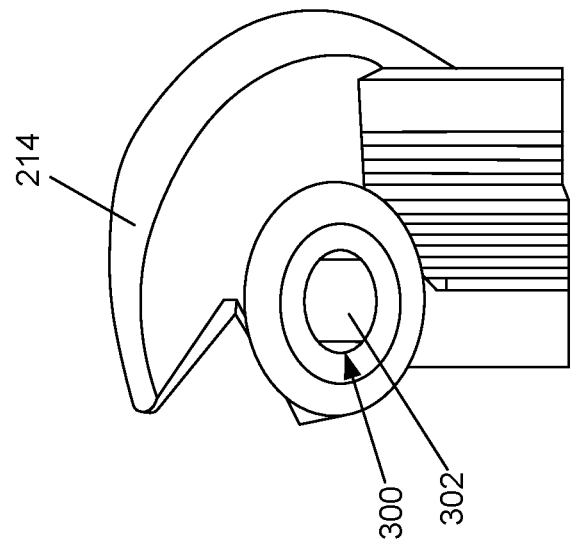
FIG. 3 is a side view of an example object built by the example additive manufacturing machine of FIG. 2.

For example, FIG. 3 illustrates an enlarged side view of the example object 214 built using the powder bed fusion machine 200 of FIG. 2. As shown, the object 214 includes an opening 300 extending through the object 214. During the AM process, one or more temporary support structures 302 are built inside of the opening 300 to support the arch (the top side of the opening). Therefore, it may be desirable to remove the support structures 302 using a subtractive manufacturing machine (e.g., drilling). Additionally or alternatively, in some examples, it may be desirable to smooth one or more surfaces or edges of the object 214.

Figure 4:
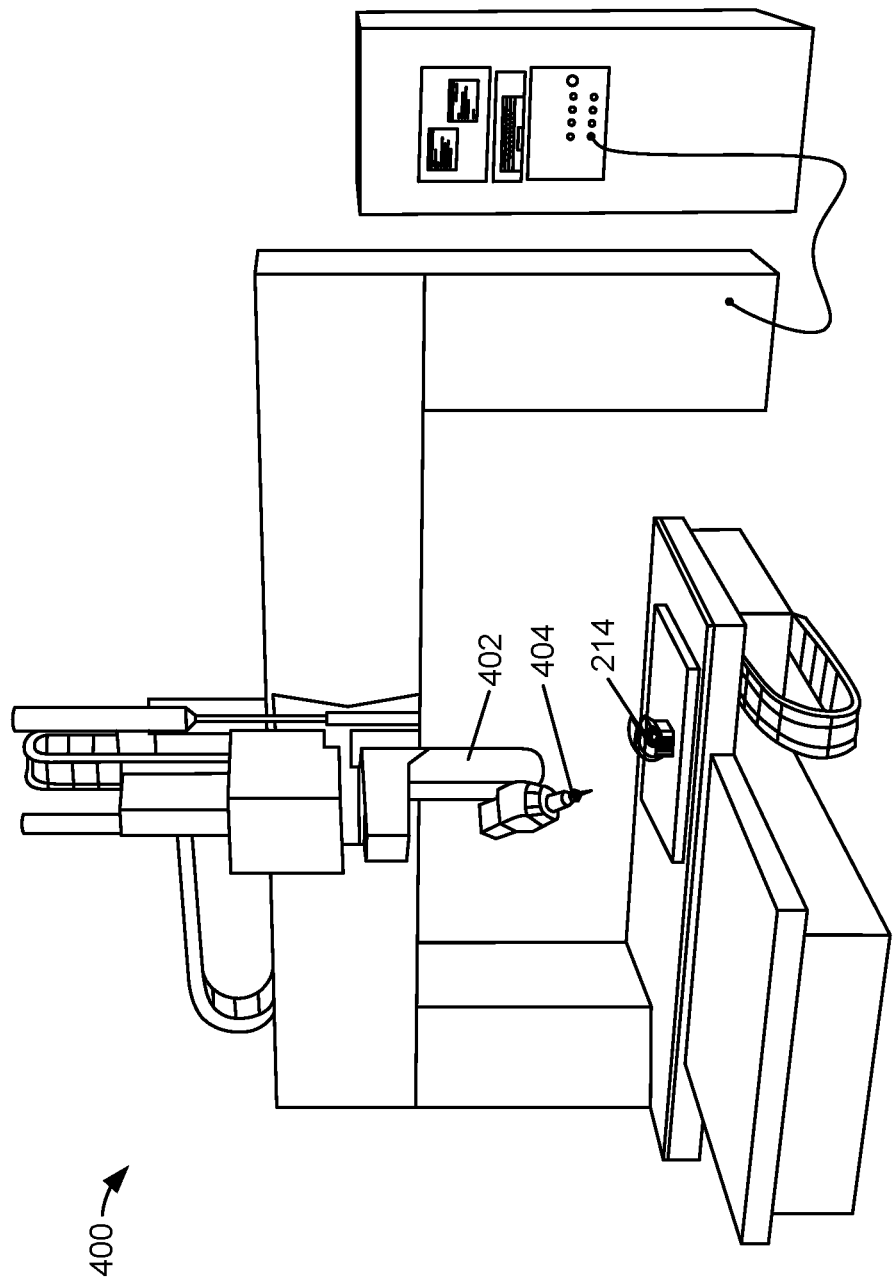
FIG. 4 illustrates an example computer numerical control (CNC) machine that may be implemented in the example automated machining system of FIG. 1 and used to perform one or more post-manufacturing process(es) on the example object of FIG. 3.

FIG. 4 illustrates an example CNC machine 400 that may be implemented as one of the post-manufacturing machine(s) 104 of FIG. 1 and which may be used to perform one or more subtractive manufacturing processes on one or more object(s), such as the object 214 of FIGS. 2 and 3. The CNC machine 400 includes a robotic arm 402 with a bit 404 for removing material from the object 214. The robotic arm 402 can be controlled to move to the bit 404 to various locations around or through the object 214 to remove material. Therefore, to perform one or more post-manufacturing process(es) on the object 214, no other objects can be in the toolpath (e.g., the path of the robotic arm 402 and/or the bit 404) around the object 214, otherwise a potential collision may occur. However, as mentioned above, it is often desired to keep objects as close together as possible and to keep the objects fixed to the substrate while performing the post-manufacturing process(es).

In particular, it is often beneficial to retain the objects on the substrate 106 while performing the one or more post-manufacturing process(es). For example, some objects (because of their geometries) may not have an appropriate fixture point to fix the object to a post-manufacturing machine. Thus, if the object is removed, an appropriate fixture point has to be added or an additional structure has to be created on the object during the AM process. Otherwise, a specialized fixture has to be built to interface with the object, which is expensive and time consuming. Also, fixing each object to a machine requires significant time and, thus, reduces cost efficiency. Further, in some instances, it may be desirable to perform the same post-manufacturing process on a plurality of the objects (e.g., cleaning, heat treating, painting, sand-blasting, etc.). Thus, rather than performing the process on each object separately, it may be more economical to perform the process on a batch of the objects at the same time. Therefore, in many instances, it is more economical and efficient to keep the objects fixed to the substrate 106 during the post-manufacturing process(es). However, as mentioned above, the post-manufacturing process(es) often include tools (e.g., drill bits, laser jets, etc.) that need to move around the object(s) to perform the respective process(es). As such, a space or volume around the object needs to be kept clear to accommodate the toolpath of the respective post-manufacturing process so that the tool does not contact another object on the substrate.

Referring back to FIG. 1, the example automated machining system 100 includes a build file generator 110 that may generate a build file defining a high-density layout of objects to increase the efficiency and productivity of the automated machining system 100. In this example, the build file generator 110 is implemented on a computer 112. The example build file generator 110 may be implemented as an application or software program executed by a processor of the computer 112. For example, the example build file generator 110 may be implemented as or part of a computer-aided design (CAD) and/or computer-aided manufacturing (CAM) application or software program. While in the illustrated example the build file generator 110 is implemented on the computer 112, in other examples, the build file generator 110 may be implemented on another type of computing device, such as a laptop, a tablet, a phone (e.g., a smart phone), a server, and/or any other electronic device.

In the illustrated example, the computer 112 receives a plurality of object files 114a-114n defining respective objects 116a-116n to be built via an AM process (e.g., via the powder bed fusion machine 200 of FIG. 2) in the example automated machining system 100. The object files 114a-114n define the dimensions of the respective objects 116-116n and/or any other parameters or characteristics of the objects 116-116n (e.g., the type of material to be used for building the object, the desired finish characteristics, tolerances, etc.). In some examples, the object file(s) 114a-114n may include or define the location of one or more support structures (e.g., the support structure 302 of FIG. 3) to be built with the respective object(s) 116a-116n.

In some examples, one or more of the object file(s) 114a-114n include an associated machining file 117a-117n, which includes the instructions for one or more post-manufacturing process(es) to be performed on the respective object 116a-116n. In some examples, the machining files 117a-117n include the toolpath volumes for the respective objects 116a-116n. Each toolpath volume represents a boundary in 3D space that is to be kept clear for the tool(s) of the post-manufacturing machine(s) 104 to perform the post-manufacturing process(es) on the respective object(s) 116a-116n. In some examples, one or more of the machining file(s) 117a-117n include multiple toolpaths for the respective object. For example, there may be multiple toolpath routes for a post-manufacturing machine to accomplish the same machining process and/or there may be different types of post-manufacturing machines that can accomplish the same machining process using different toolpath routes. The toolpath volume(s) for an object may have been determined manually, for example, by a machinist and/or via a software program. For example, an object may be built (according to its object file) via an AM process, and then a machinist may develop the machining file for the object based on the one or more post-manufacturing process(es) used to finalize the object. The machinist may define the toolpath volume(s) for the object based on the space or clearance needed during the one or more post-manufacturing process(es). The toolpath volume(s) may be included as part of the machining files 117a-117n and/or the respective object files 114a-114n for the objects 116a-116n. While the example machining files 117a-117n are depicted as being separate files in FIG. 1, in other example, the machining files 117a-117n may be part of the respective object files 114a-114n for the objects 116a-116n.

In some examples, the object files 114a-114n may be received as work orders. The work orders may include other information, such as a request date, an expected delivery date, special instructions for delivery, etc. In some examples, one or more of the object file(s) 114a-114n and/or the machining file(s) 117a-117n are part of a library of objects. In such an example, one or more work orders may be received to build one or more of the object(s) 116a-116n from the library. The object file(s) 114a-114n and/or the associated machining file(s) 117a-117n may be stored in a memory 120, for example. As such, the object file(s) 114a-114n and the corresponding toolpath volume(s) for each of the object(s) 116a-116n may be stored in the memory 120. Additionally or alternatively, the computer 112 may receive one or more of the object file(s) 114a-114n and/or the associated machining file(s) 117a-117n via any wired or wireless connection. For example, one or more of the object file(s) 114-114n and/or the associated machining file(s) 117a-117n may be transmitted over the Internet to the computer 112, uploaded via a thumb-drive or other storage medium, etc. In some examples, one or more of the object files 114a-114n and/or the associated machining file(s) 117a-117n are generated on the computer 112 (e.g., via a CAD software program).

In the illustrated example, the build file generator 110 includes an object file manager 118 that receives and manages the object files 114-114n and/or the associated machining file(s) 117a-117n. In some examples, the object file manager 118 extracts information from the object files 114-114n and/or the associated machining file(s) 117a-117n and organizes or sorts the object files 114-114n and/or the associated machining file(s) 117a-117n based on, for example, number of objects to be built, size of the respective object to be built, size of the associated toolpath volume, request date, expected delivery date, etc. In some examples, the object files 114-114n (and the associated machining file(s) 117a-117n) to be built are saved in the memory 120.

In some examples, as disclosed above, the toolpath volumes for the objects 116a-116n may be predefined (e.g., included in the associated machining files 117a-117n). In other examples, such as with a new object or object file, the build file generator 110 may include a volume definer 122. The volume definer 122 may define one or more toolpath volumes around an object based on the desired post-manufacturing process(s) to be performed on the respective object. In some examples, the toolpath volume(s) (e.g., as defined by distances from the surfaces of the object) are saved in the memory 120 with the associated object files.

As mentioned above, in many instances, one or more post-manufacturing process(es) are to be performed on the object(s) 116a-116n by the post-manufacturing machine(s) 104 after the object(s) 116a-116n are built on the substrate 106 by the AM machine 102. The example post-manufacturing machine(s) 104 and/or process(es) may include subtractive type manufacturing processes such as, for example, CNC machining (e.g., performed by the CNC machine 400 of FIG. 4), laser etching (e.g., to etch a serial number into an object), electrical discharge machining (EDM), electrochemical erosion, laser cutting, water cutting, polishing, turning, drilling, boring, reaming, milling, shaping, planing, broaching, sawing, cutting, abrasive flow machining, etc. Additionally or alternatively, example post-manufacturing machine(s) 104 and/or process(es) may include other types of machine(s) and/or process(es), such as de-powdering units, washing units, painting, media blasting, priming, heat treating, 3D scanning, a coordinate measuring machine (CMM), shot peening, etc.

Figure 5:
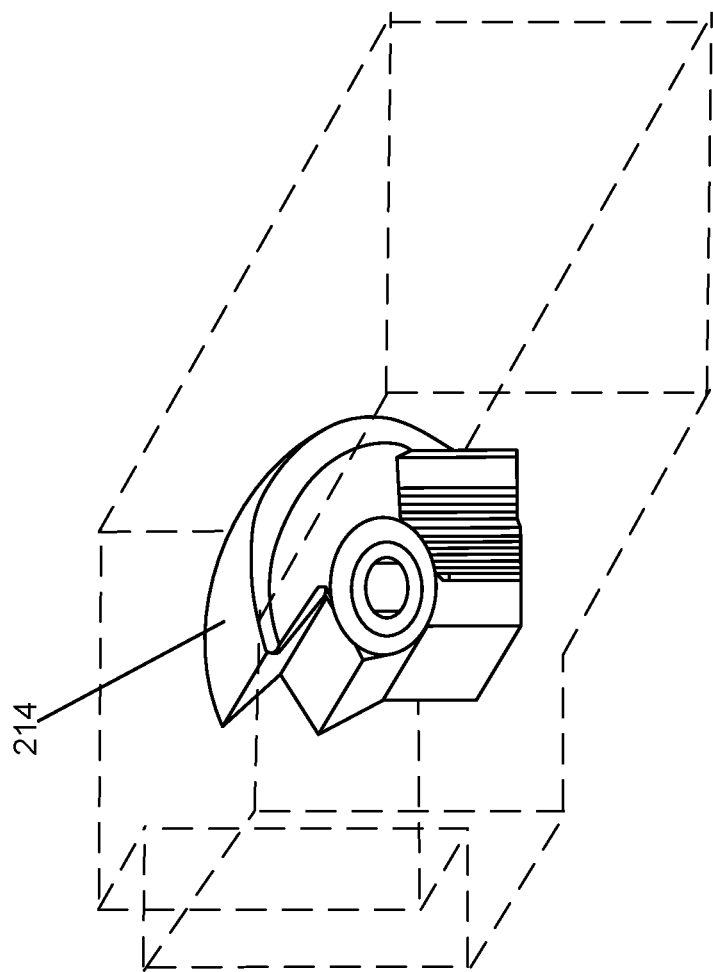
FIG. 5 illustrates an example toolpath volume that may be defined around the example object of FIG. 3 and used by the example build file generator of FIG. 1.

For example, referring briefly to FIG. 5, FIG. 5 shows an example toolpath volume (shown in dashed lines) around the object 214 (which may correspond to one of the objects 116a-116n). The toolpath volume represents the space around the object 214 that one or more tool(s) of the post-manufacturing machine(s) 104 may travel when performing operations (e.g., drilling, cleaning, measuring, painting, etc.) on the object 214.

In some examples, the specific post-manufacturing process(es) to be performed on an object are defined by the associated machining file. For example, the one or more post-manufacturing process(es) may be pre-selected based on certain specifications of the object (e.g., based on a certain tolerance or surface smoothness to be achieved). In such an example, one or more post-manufacturing process(es) may be selected to smooth the surfaces of the object after the object is built by the AM machine 102 and defined in the associated machining file. Additionally or alternatively, a user (e.g., a customer) may request one or more post-manufacturing process(es) (e.g., sand blasting, cutting, painting, etc.) to be performed on the object after being built by the AM machine 102. In other examples, one or more post-manufacturing process(es) may be selected in other manners and/or based on other considerations. The toolpath volume may depend on one or more factors, such as the size and shape of the respective object, the type of post-manufacturing process(es) to be performed, the type of post-manufacturing machine(s) (e.g., a model of CNC machine) used to perform the process(es), etc. Different ones of the post-manufacturing machine(s) 104 and/or process(es) may result in different toolpath volumes around an object to perform the respective post-manufacturing process(es).

To determine the layout of object(s) and/or sequence of post-manufacturing process and removal of the object(s), the example build file generator 110 includes a layout and sequence determiner 124 (sometimes referred to as a layout determiner). The layout and sequence determiner 124 analyzes the sizes of the objects 116a-116n (and/or the possible orientations of the objects 116a-116n), the sizes of the toolpath volumes associated with the objects 116a-116n, and/or the size of the substrate 106 and determines a layout of a plurality of the objects 116a-116n on the substrate 106 that results in a dense arrangement (e.g., an arrangement that consumes the smallest area of the substrate 106). Additionally or alternatively, the layout and sequence determiner 124 may consider one or more other factors or parameters when selecting the objects 116a-116n to build on the same substrate, such as the other possible toolpath routes or volumes associated with an object, a request date of an object (e.g., a date a work order was place), a promise date of a work order, the anticipated time of completing the object, etc. In some examples, a user may be able to weigh these factors based on importance.

The example layout and sequence determiner 124 determines a layout that maximizes the density of objects to be built. In some examples, the layout and sequence determiner 124 selects a subset of objects (e.g., two or more objects) from the plurality of objects 116a-116n. Further, the layout and sequence determiner 124 determines a sequence of post-manufacturing processes that are to be performed on the object(s) 116a-116n and removal of the object(s) 116a-116n. An example of this process is disclosed in further detail in conjunction with FIGS. 8A-8J. In some examples, one or more of the object(s) 116a-116n built on the same substrate 106 are a same type of object. In other examples, a plurality of different types of objects are to be built on the same substrate 106.

In some examples, the example build file generator 110 includes an AM formatter 126 that formats, renders and/or otherwise generates the build file 108 based on the layout and sequence determined by the layout and sequence determiner 124 for building in the AM machine 102. For example, the AM formatter 126 may format the build file 108 for the specific type(s) of machine(s) that are going to build and/or work on the objects. For example, the AM formatter 126 may convert the layout into a stereo lithography file (STL file) or other type of AM file for use by the AM machine 102. In some examples, the AM formatter 126 includes a slicer that creates or defines each of the layers to be built by the AM machine 102 and, thus, provides the instructions for building the object(s) 116a-116n according to the layout. In other examples, the AM formatter 126 may perform one or more other process(es) (e.g., numerical control (NC) deposition control) to format the layout to be built by the AM machine 102. In other examples, the build file 108 may include an unformatted version of the layout and shapes of the object(s) and the AM machine 102 may perform any formatting to create the instructions (e.g., instructions for the laser) for creating the objects 116a-116n.

Once the build file 108 is generated, the AM machine 102 may build the object(s) 116a-116n on the substrate 106 according to layout defined by the build file 108. In some examples, the build file 108 is transmitted to the AM machine 102 via a wired or wireless connection (e.g., an intranet system of a machining or manufacturing facility). In some examples, the build file 108 is transferred to the AM machine 102 via a storage medium (e.g., a thumb drive, a CD, etc.). In other examples, the computer 112 may be a computer or workstation associated with the AM machine 102 for operating the AM machine 102 and, thus, the build file 108 is not transferred outside of the computer 112.

After the object(s) 116-116n are built or formed on the substrate 106, the one or more post-manufacturing process(es) are performed on the object(s) 116-116n via the post-manufacturing machine(s) 104 and the object(s) are removed from the substrate 106. The post-manufacturing process(es) and removal are performed according to the sequence defined by the layout and sequence determiner 124. In some examples, one or more post-manufacturing process(es) may be performed on multiple ones of the object(s) 116a-116n on the substrate 106 at the same time. For example, after the object(s) 116a-116n are built on the substrate 106, the substrate 106 (along with the associated objects 116a-116n) may be sent to a de-powdering unit to de-powder the substrate 106, may be sent to a washer to be cleaned, may be sent to a heater for heat treatment, may be sent to a 3D scanner or CMM to identify/confirm the measurements and shapes of the object(s) 116-116n, etc. Thus, in some examples, one or more post-manufacturing process(es) may be performed on multiple ones of the object(s) 116-116n before the object(s) 116-116n are removed in sequence (and/or additional post-manufacturing processes are performed on the object(s) 116-116n).

In some examples, the layout and sequence determiner 124 may determine the layout and sequence based on common post-manufacturing process(es) that are to be performed on multiple ones of the object(s) 116a-116n. For example, the sequence may include performing a post-manufacturing process (e.g., using a certain cutter) on multiple ones of the objects 116a-116n that require the same post-manufacturing process at the same time or immediate sequence before further processing the objects 116a-116n and/or removing the objects 116a-116n, rather than performing each machining sequence for each of the objects 116a-116n all the way through. In some examples, the object files 114a-114n and/or machining files 117a-117n for the object 116a-116n may define the individual or discrete toolpath volumes for each of the post-manufacturing process(es) to be performed on a respective object, rather than a total toolpath volume for all of the tools paths used on a certain object. In some such examples, the layout and sequence determiner 124 may consider the individual toolpath volumes for each of the post-manufacturing process to be performed each of the objects 116a-116n when determining the layout and sequence, to ensure no collision occurs when using the same post-manufacturing process to machine on multiple ones of the objects 116a-116n at the same time or in an order. As such, rather than implementing a sequence where the substrate 106 is sent back to the same post-manufacturing machine at various times, the sequence may include performing the post-manufacturing process on the corresponding objects at the same time or in an immediate order (depending on the space limitations), which increases efficiency and productivity.

In some examples, the build file generator 110 includes a machining file generator 128 that generates a machining file 130 for the build (e.g., the batch of objects on the substrate 106) that includes the determined sequence. The machining file 130 may be stored in the memory 120, for example, as associated with the build file 108. The machining file 130 may be transmitted (via a wired or wireless connection) to the post-manufacturing machine(s) 104, which may perform the post-manufacturing process(es) on the object(s) 116a-116n in accordance with the sequence. In some examples, the machining file 130 includes the individual machining file(s) 117a-117n of the object(s) 116a-116n on the substrate 106, such that the post-manufacturing machine(s) 104 can perform the specified post-manufacturing process(es) according to the respective machining file(s) 117a-117n. In some examples, the machining file generator 128 generates and/or transmits one or more inspection files along with the machining file 130 that is/are associated with the build. An inspection file may include instructions for a 3D scan or CMM program, for example, that may occur before or after one or more the object(s) 116a-116n is/are removed from the substrate 106. The inspection file(s) may be used to ensure the object(s) 116a-116n is/are built to the proper specification (e.g., within a threshold) (by the AM machine 102, for example) before starting one or more other post-manufacturing process(es) (e.g., machining) and/or that the object(s) 116a-116n meet their final dimensional specifications (e.g., with a threshold) before being removed from the substrate 106, for example.

Figure 6:
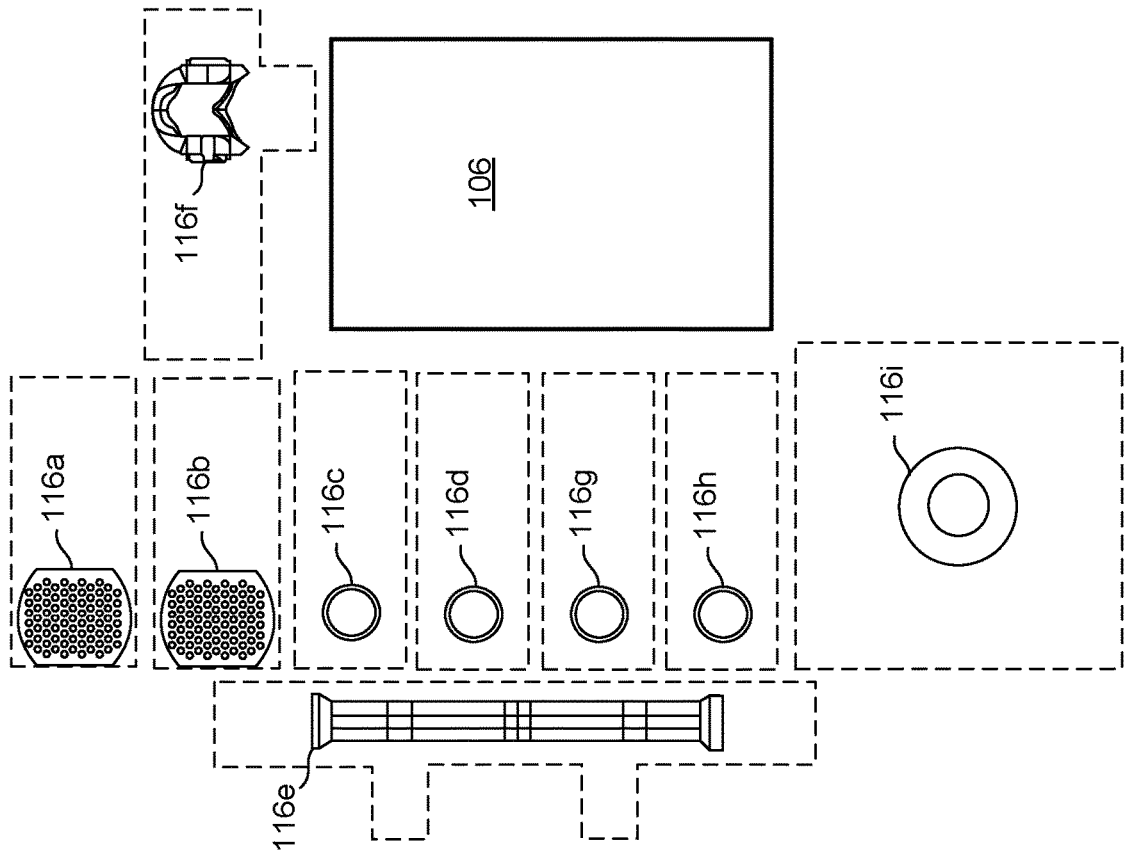
FIG. 6 illustrates example objects and an example substrate on which the example object may be built.

FIG. 6 is a plan view showing example objects to be built on the substrate 106. In particular, FIG. 6 shows nine objects 116a-116i. The toolpath volumes are shown around each of the objects 116a-116i in dashed lines for illustrative purposes. The toolpath volumes may be obtained from the machining files 117a-117i associated with the objects 116a-116i and/or defined by the volume definer 122 (FIG. 1), for example. As disclosed herein, the toolpath volumes represent the space around the respective objects 116a-116i needed for the one or more post-manufacturing process(es) to be performed on the objects 116a-116i. In the illustrated example, the first and second objects 116a, 116b are a same type of object and the third, fourth, seventh, and eighth objects 116c, 116d, 116g, 116h are a same type of object. As can be understood by looking at FIG. 6, the toolpath volumes around the objects 116a-116i create a relatively large area, while the substrate 106 has a relatively small area. If the objects 116a-116i were to be spaced on the substrate 106 such that none of the toolpath volumes overlapped, only a few of the parts could be built, or a much larger substrate and AM machine would be needed. The layout and sequence determiner 124 determines a layout and sequence of removal that enables the objects 116a-116i to be post-processed and removed without interfering with each other while still arranging the objects in a relatively dense spatial arrangement to fit the most objects on the same substrate 106.

Figure 7:
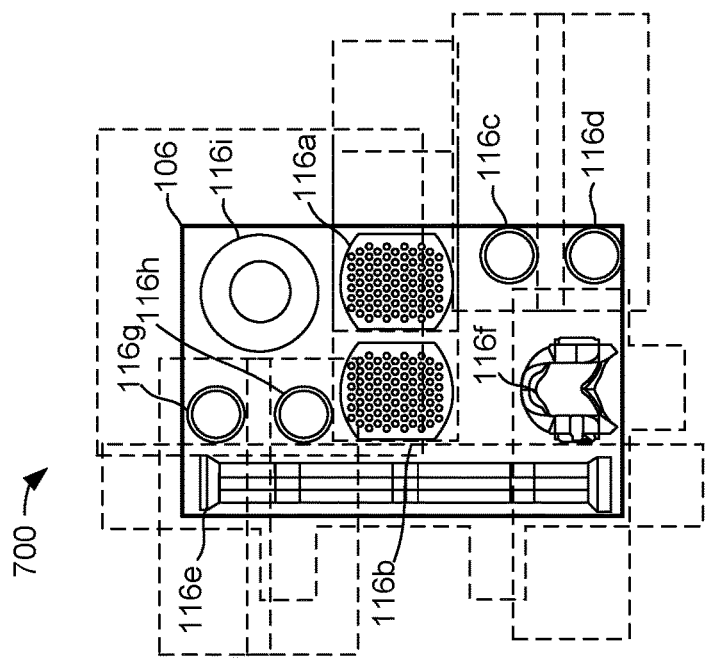
FIG. 7 illustrates an example layout of the example objects of FIG. 6 on the example substrate as defined by an example build file that may be generated by the example build file generator of FIG. 1.

FIG. 7 illustrates an example layout 700 determined by the layout and sequence determiner 124. Use of the build file generator 110 enables the objects 116a-116i to be densely arranged on the substrate 106 in a layout that would otherwise not be achievable. As illustrated, many of the objects 116a-116i are disposed within (or partially within) the toolpath volumes of the other objects 116a-116i. For example, according to the layout 700, the first object 116a is disposed within the toolpath volume associated the second object 116b. However, because the objects 116a-116i are removed according to a sequence, the toolpath volume for each subsequent object is opened up. An example sequence for post-processing and removal of the objects 116a-116i may be, for example, (1) the first object 116a, (2) the second object 116b, (3) the third object 116c, (4) the fourth object 116d, (5) the fifth object 116e, (6) the sixth object 116f, (7) the seventh object 116g, (8) the eighth object 116h, and (9) the ninth object 116i. In some examples, as disclosed herein, an object may have multiple toolpath volumes that are possible with the associated object, and the layout and sequence determiner 124 may select between different ones of the toolpath volumes to create the densest layout with the other objects. For example, as illustrated in FIG. 7, the toolpath volumes for the seventh object 116g and the eighth object 116h are reversed as compared to the toolpath volumes for the third object 116c and the fourth object 116d. Therefore, in some examples, multiple toolpath volumes (or different orientations of the same toolpath volume) are analyzed by the layout and sequence determiner 124 to determine the optimal arrangement of objects.

Figure 8A:
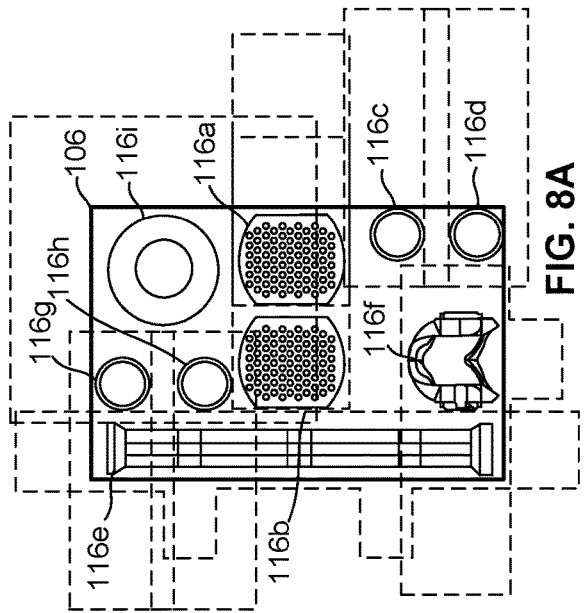
Figure 8B:
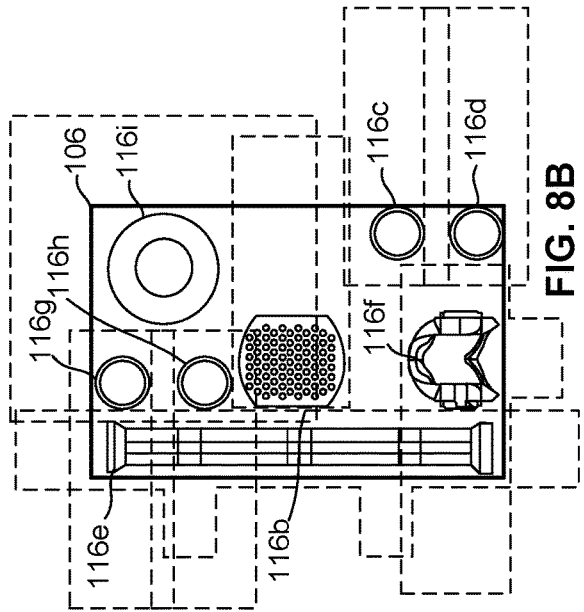
Figure 8C:
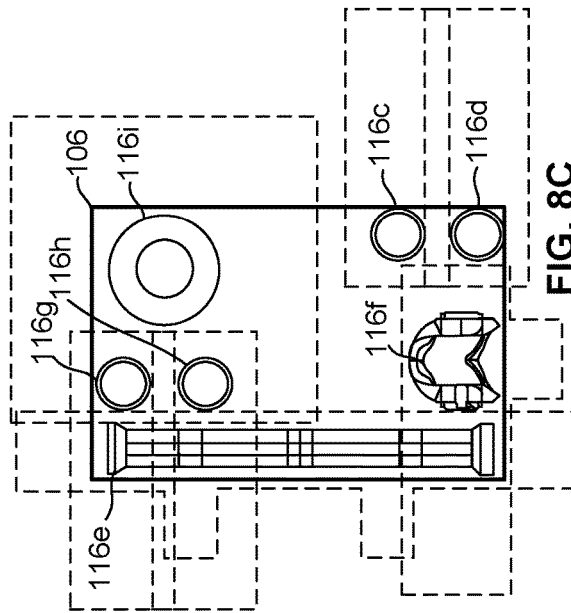
Figure 8D:
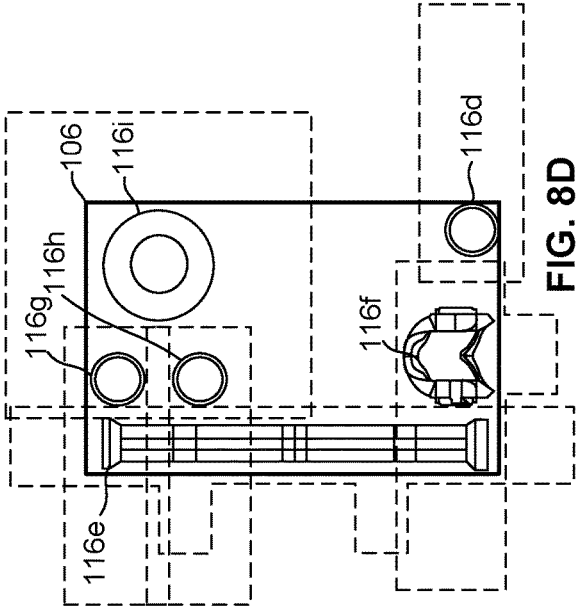
Figure 8J:
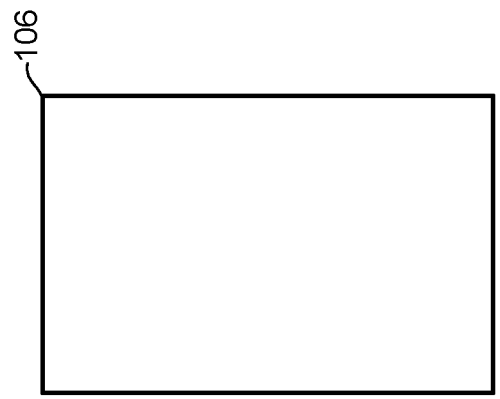
Figure 8I:
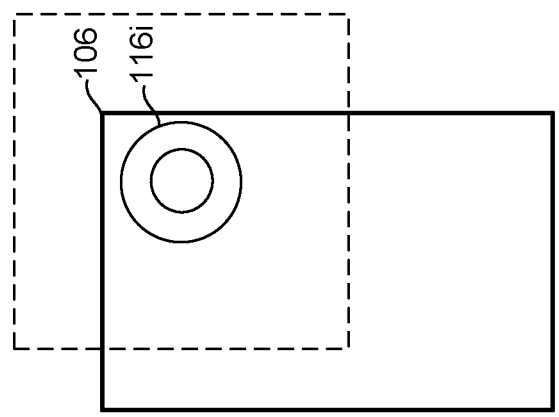

For example, FIGS. 8A-8J show an example sequence of the objects 116a-116i being processed (via one or more post-manufacturing process(es)) and/or removed from the substrate 106 according to the sequence. The toolpath volumes are also shown in dashed lines in the example FIGS. 8A-8J for illustrative purposes. As mentioned above, assume, for example, the first object 116a is the first object in the sequence to be post-processed (if a post-manufacturing process is desired) and removed from the substrate 106. As shown in FIG. 8A, there are no other objects disposed in the toolpath volume of the first object 116a. Therefore, the post-manufacturing process(es) for the first object 116a can be performed on the first object 116a without the risk of tool collision. After the post-manufacturing process(es) are performed on the first object 116a, the first object 116a is removed from the substrate 106, as shown in FIG. 8B. The first object 116a may be removed via a tool (e.g., a slotting tool, a mill, etc.) on the same post-manufacturing machine the performed the post-manufacturing process(es) (e.g., the CNC machine 400 of FIG. 4) or another post-manufacturing machine.

Once the first object 116a is removed from the substrate 106, the toolpath volume associated with the second object 116b is cleared. Then, the post-manufacturing process(es) to be performed on the second object 116b (e.g., which may be the same as the post-manufacturing process(es) performed on the first object 116a) can be performed on the second object 116b. Then, similar to the first object 116a, the second object 116b is removed from the substrate 106 (e.g., via a slotting tool, a mill, etc.), and the example sequence continues. As shown in FIGS. 8A-8J, each time one of the objects 116a-116i is processed and removed from the substrate 106, the toolpath volume for the next object in the sequence is cleared. While in this example nine objects are built on the substrate 106, in other examples, more or fewer objects may be built on the substrate 106. In some examples, only two objects are built on the same substrate.

In some examples, when one or more of the objects 116-116i are removed from the substrate 106, the substrate 106 may be turned over or tilted to allow the respective object(s) 116a-116i to fall into a collection device, such as a catch shoot or a modified chip conveyor. In some examples, to prevent damage to the object(s) 116a-116i when removing and/or collecting the object(s) 116a-116i, the objects 116a-116i may be protected. For example, in some instances, one or more protective covers (e.g., a corrugated polymer sock) may be placed (e.g., via an operator or an automated machine) on one or more of the objects 116a-116i before removing the respective object(s) 116-116i from the substrate 106. Then, when the object(s) 116a-116i is/are removed from the substrate 106, the object(s) 116a-116i is/are protected from potential damage when falling from the substrate 106.

Figure 9A:
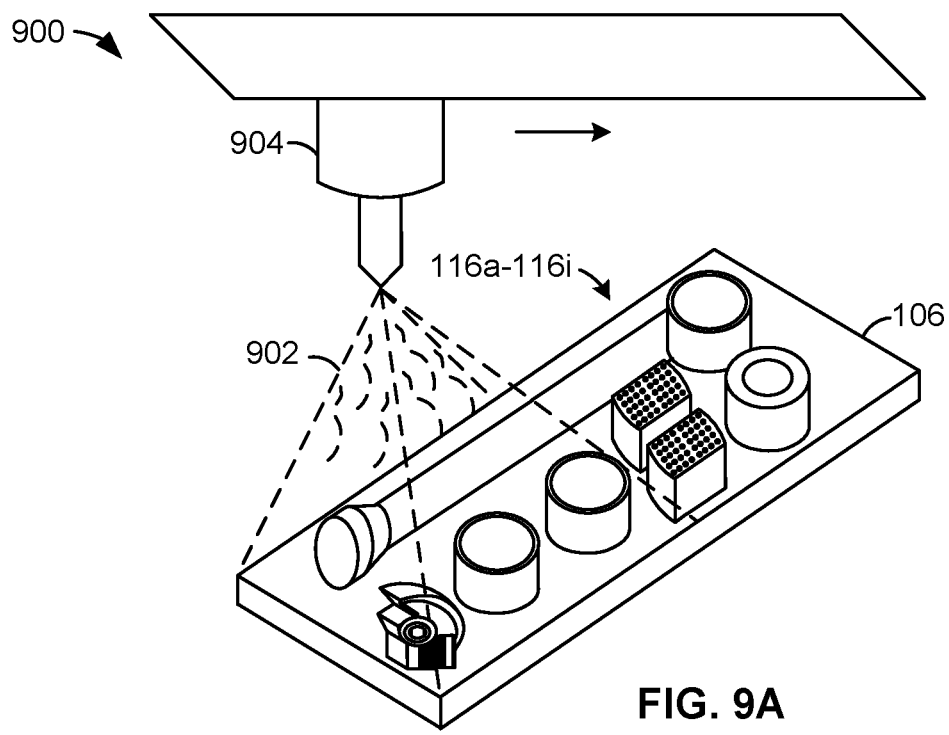
FIGS. 9A and 9B illustrate an example machine that may be implemented in the example automated machining system of FIG. 1 and used to spray a protective foam on one or more objects.
Figure 9B:
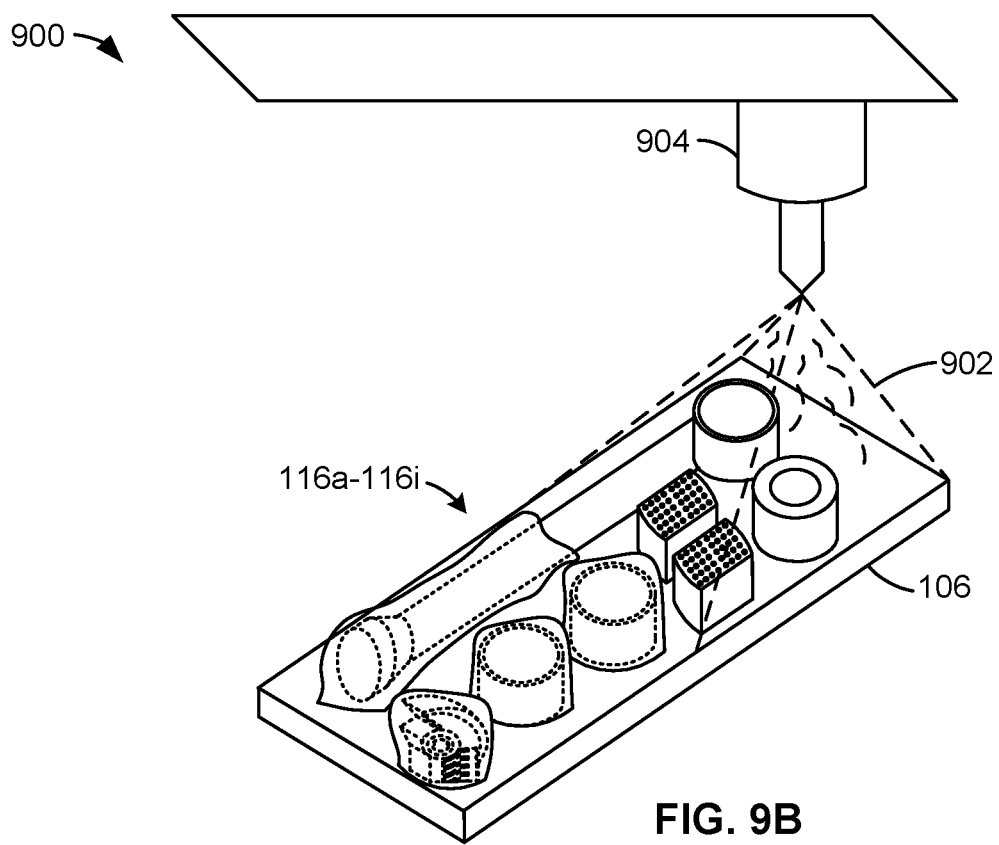

In another example, a protective foam may be sprayed onto the objects 116a-116i. For example, FIGS. 9A and 9B illustrate an example machine 900 that may be used to spray a protective foam 902 onto one or more the object(s) 116-116i on the substrate 106. The objects 116a-116i depicted in FIGS. 9A and 9B are not exactly the same or in the same positions as shown in FIGS. 8A-8J, but are depicted merely for illustrative purposes. The machine 900 may correspond to one of the post-manufacturing machine(s) 104 (FIG. 1), for example. In the illustrated example, the machine 900 includes a moveable nozzle 904 (as shown moving between FIGS. 9A and 9B) that sprays the protective foam 902, which may harden or semi-harden to provide a cushioning layer on the surfaces of the objects 116a-116i. The protective foam 902 may be, for example, an expanding urethane foam, a two part foam, and/or another type of foam. In some examples, a foam is selected that does not leave a residue on the object(s) 116a-116i after being removed (e.g., dissolved). The one or more post-manufacturing process(es) may be performed on the object(s) 116a-116i even with the protective foam 902. As such, the protective foam 902 stays attached to the areas on the object(s) 116-116i that are not machined. The protective foam 902 protects the object(s) 116a-116i when they are removed from the substrate 106 and collected (e.g., dropped into a collection device). Further, the protective foam 902 may also reduce chatter in relatively larger (taller) parts and/or dampen machining chatter or vibration during the post-manufacturing process(es). Then, once the object(s) 116a-116i is/are removed, the protective foam 902 may be removed. For example, the protective foam 902 may be a soluble material (e.g., water soluble) that dissolves in a liquid solution (e.g., a non-toxic solvent). In other examples, the protective foam 902 may be removed via media blasting.

In some examples, instead of using the layout and sequence determiner 124 to determine the layout and sequence, the layout and/or sequence may be determined manually by a user. For example, the build file generator 110 may display, on a display screen of the computer 112, an image of the substrate 106 and a plurality of the objects 116a-116n on to enable the user to position the object(s) 116a-116n in a desired layout (e.g., by clicking and dragging) on the substrate 106. The object(s) 116a-116n may be displayed as 2D or 3D representations with the toolpath volumes around the respective object(s) 116a-116n so that the user can see how the object(s) 116a-116n are positioned relative to each other and to the toolpath volumes of the other object(s) 116a-116n. The user may select one or more of the object(s) 116a-116n and position one or more of the object(s) 116-116n on the substrate 106 in a layout where one or more of the object(s) 116a-116n are disposed in a toolpath volume of one or more the object(s) 116a-116n, as disclosed in accordance with the teachings of this disclosure. The user may also select the sequence of removal based on the layout. Then, when the desired layout is achieved, the build file generator 110 may remove the toolpath volumes, the build file formatter 126 may create the build file 108 for the AM machine 102 based on the final layout, and the machining file generator 128 may crate the machining file 130 based on the determined sequence.

While in the illustrated example of FIG. 1 the build file generator 110 is illustrated as being part of the automated machining system 100 (e.g., part of a machining or manufacturing facility), in other examples, the build file generator 110 may be implemented by a computing device that is remote to the automated machining system 100. For example, the build file generator 110 may be implemented by a cloud-based computing device (e.g., a server, a virtual machine, etc.) that is remote to a machining facility containing the AM machine 102 and the post-manufacturing machine(s) 104. In such an example, the build file generator 110 may transmit the generated build file and/or determined sequence to the facility to be manufactured via the AM machine 102 and/or the post-manufacturing machine(s) 104. In some examples, the computer 112 may be the same computing device that controls the operations of the AM machine 102 and/or the post-manufacturing machine(s) 104. In other examples, one or more separate computing devices may be used to control the operations of the AM machine 102 and/or the post-manufacturing machine(s) 104.

Also, while in the illustrated example the post-manufacturing machine(s) 104 are shown as separate from the AM machine 102, it is understood that one or more of the post-manufacturing processes may be performed directly by the AM machine 102. For example, the AM machine 102 may include one or more tools for de-powdering the substrate 106, cleaning the objects 116a-116n, cutting material, drilling material, etc. Thus, in some examples, after the object(s) 116-116n are built using the AM machine 102, the object(s) 116-116n (along with the substrate 106) remain in the AM machine 102 for one or more post-manufacturing process(es).

Also, while in some of the examples disclosed herein the toolpath volumes are defined as volumes or 3D spaces around the respective object, in other examples, a toolpath area or zone having only two dimensions may be implemented. For example, a toolpath area or zone defined by X, Y coordinates may be used to define an area or zone relative to the respective object, without consideration of the Z direction.

In some examples, the sequence or one or more portions of the sequence is/are sent to the post-manufacturing machine(s) 104 (e.g., as part of the machining file 130) to perform the post-manufacturing process(es) and removal according to the sequence. In other examples, the sequence of post-manufacturing process(es) and removal for the objects of a substrate are included in the build file 108. In such an example, the build file 108 (along with the sequence) may be sent to the post-manufacturing machine(s) 104 (and/or the machine for removing the objects).

As disclosed herein, in some examples, the build file generator 110 selects a subset of the objects 116a-116n to be built on the substrate 106 (e.g., a first batch). The example build file generator 110 may continue to generate build files with the remaining ones of the object(s) 116a-116n until all of the work orders are satisfied. Further, in some examples, multiple AM machines may be implemented in the automated machining system 100. Therefore, in some examples, multiple AM processes may be used to build objects simultaneously.

While an example manner of implementing the example build file generator 110 is illustrated in FIG. 1, one or more of the elements, processes and/or devices illustrated in FIG. 1 may be combined, divided, re-arranged, omitted, eliminated and/or implemented in any other way. Further, the example object file manager 118, the example volume definer 122, the example layout and sequence determiner 124, the example AM formatter 126, the example machining file generator and/or, more generally, the example build file generator 110 of FIG. 1 may be implemented by hardware, software, firmware and/or any combination of hardware, software and/or firmware. Thus, for example, any of the example object file manager 118, the example volume definer 122, the example layout and sequence determiner 124, the example AM formatter 126, the example machining file generator 128 and/or, more generally, the example build file generator 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example object file manager 118, the example volume definer 122, the example layout and sequence determiner 124, the example AM formatter 126, and/or the example machining file generator 128 is/are hereby expressly defined to include a non-transitory computer readable storage device or storage disk such as a memory, a digital versatile disk (DVD), a compact disk (CD), a Blu-ray disk, etc. including the software and/or firmware. Further still, the example build file generator 110 of FIG. 1 may include one or more elements, processes and/or devices in addition to, or instead of, those illustrated in FIG. 1, and/or may include more than one of any or all of the illustrated elements, processes and devices.

Figure 10:
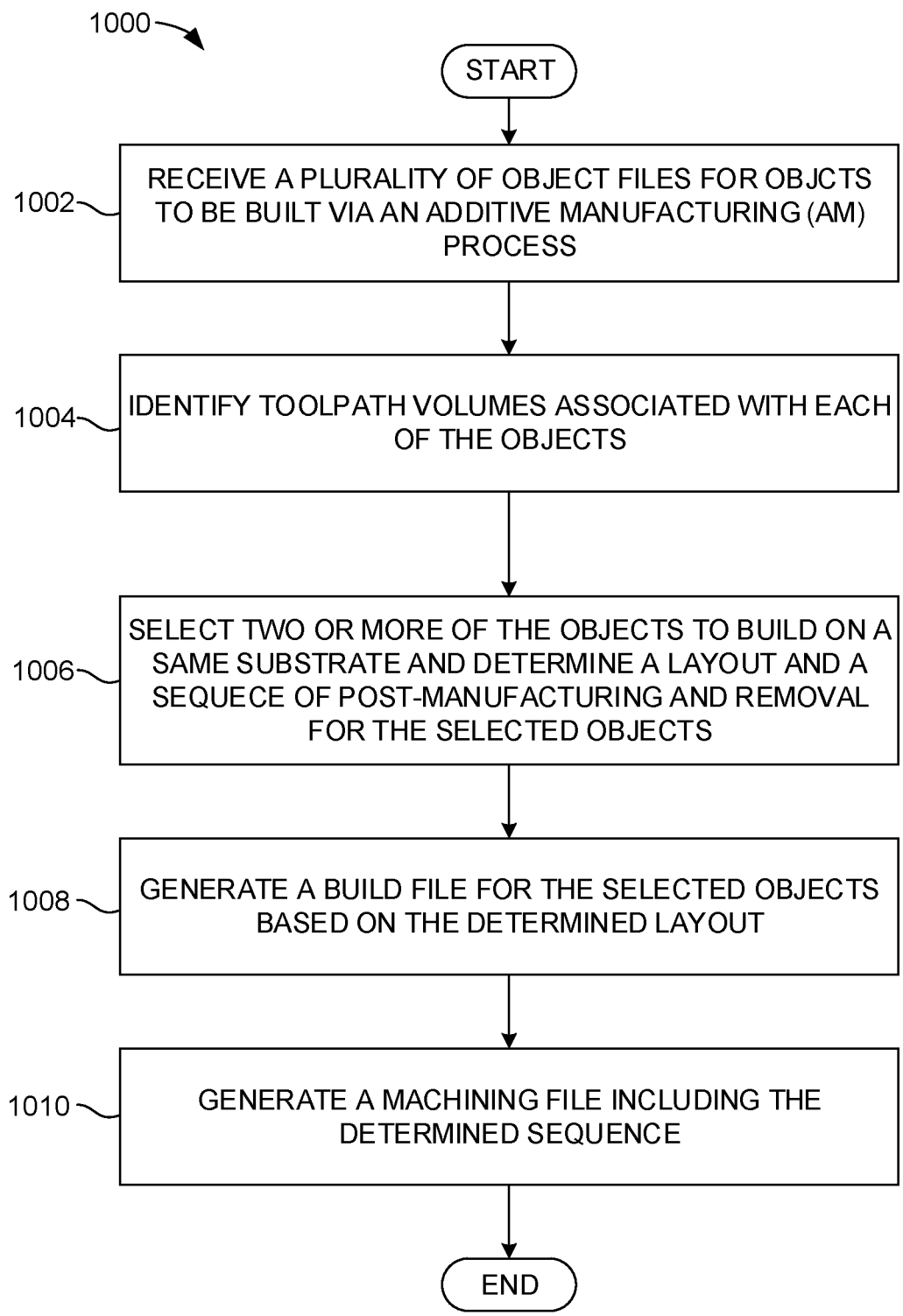
FIG. 10 is a flowchart representative of example machine readable instructions that may be executed to implement the example build file generator of FIG. 1.

A flowchart representative of example machine readable instructions for implementing the build file generator 110 of FIG. 1 is shown in FIG. 10. In this example, the machine readable instructions comprise a program for execution by a processor such as the processor 1212 shown in the example processor platform 1200 discussed below in connection with FIG. 12. The program may be embodied in software stored on a non-transitory computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIG. 10, many other methods of implementing the example build file generator 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.)

structured to perform the corresponding operation without executing software or firmware.

As mentioned above, the example processes of FIG. 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 10 is a flowchart 1000 representative of example machine readable instructions that may be executed by a processor (e.g., a processor of the computer 112) to implement the build file generator 110 of FIG. 1. The example process of FIG. 10 is described in connection with the example automated machining system 100 of FIG. 1 having the AM machine 102 and the post-manufacturing machine(s) 104. However, in other examples, the example process of FIG. 10 may be implemented in connection with other types of systems or manufacturing facilities having more or fewer AM machines and/or post-manufacturing machines.

At block 1002, the object file manager 118 receives a plurality of object files (e.g., work orders), such as the object files 114a-114n, corresponding to objects to be manufactured via an AM process. At block 1004, the object file manager 118 identifies or determines the one or more toolpath volumes associated with each of the objects. The toolpath volumes are associated with one or more toolpath(s) for one or more post-manufacturing process(es) that are to be performed on the respective objects. The toolpath volumes represent boundaries or coordinates defining a space that is to be cleared for the tool(s) of the post-manufacturing machine(s) 104 to perform the post-manufacturing process(es) on the respective objects. In some examples, the object file manager 118 identifies the toolpath volumes from the machining file(s) 117a-117n associated with the one or more object file(s) 114a-114n. The object file(s) 114a-114n and the associated toolpath volumes may be stored in a library, for example. In some examples, one or more of the objects may have multiple toolpath volumes representing multiple possible toolpaths. Additionally or alternatively, the example volume definer 122 may define one or more toolpath volumes for one or more of the objects 116a-116n. For example, the volume definer 122 may define a first toolpath volume associated with a first object, a second toolpath volume associated with a second object, and so forth. In such an example, identifying the toolpath volume(s) at block 1004 includes defining the volume(s) associated with one or more of the objects. In some examples, no post-manufacturing processes are to be performed on an object. In such an example, no toolpath volume is identified and/or defined.

At block 1006, the layout and sequence determiner 124 performs an analysis based on the toolpath volumes (and/or one or more other parameters) and selects two or more (e.g., a set) of the objects 116a-116n to build on a same substrate and determines a layout and a sequence of post-manufacturing and removal for the objects. For example, the layout and sequence determiner 124 may perform a mathematical computation that analyzes the sizes of the objects 116a-116n (and/or the possible orientations of the objects 116a-116n), the sizes of the one or more toolpath volumes associated with each of the objects 116a-116n, and/or the size of the substrate 106. Additionally or alternatively, one or more other factors may be considered when selecting the objects to build on the same substrate, such as a request date of an object (e.g., a date a work order was placed), a promise date of a work order, the anticipated time of completing the object, etc. In some examples, the example layout and sequence determiner 124 determines a layout that maximizes the population density of the objects to be built (i.e., maximizes the number of objects on a given substrate).

In some examples, in the determined layout, one or more of the selected objects 116a-116n are disposed within (or partially within) the toolpath volume(s) of one or more other ones of the objects 116a-116n. For example, as in the example layout 700 of FIG. 7, the first object 116a is disposed within the toolpath volume associated with the second object 116b. However, as disclosed above in connection with FIGS. 8A-8J, the sequence of post-manufacturing and removal of the objects 116a-116i enables the respective toolpath volumes to be cleared before the post-manufacturing process for a respective object is to be performed.

At block 1008, the AM formatter 126 generates the build file 108 for the selected objects based on the determined layout. In some examples, the AM formatter 126 formats the build file 108 for a specific type of AM machine (e.g., generates the instructions for creating each layer of the object(s)). Once the build file 108 is generated, the build file 108 may be used by the AM machine 102 to create the object(s) on the substrate 106 according to the layout. At block 1010, the machining file generator 128 generates the machining file 130 containing the sequence of post-manufacturing and removal of the objects. In some such examples, the machining file 130 is used by the post-manufacturing machine(s) 104 to perform the post-manufacturing process(es) and removal of the objects. In other examples, the determined sequence may be included as part of the build file 108, which may instead be used by the post-manufacturing machine(s) 104. In some examples, the machining file generator 128 generates one or more inspection files that may be used by one or more of the post-manufacturing machine(s) 104, such as a 3D scanner or CMM, to ensure the object(s) 116a-116n are built to their proper specification before machining and/or removal.

Figure 11:
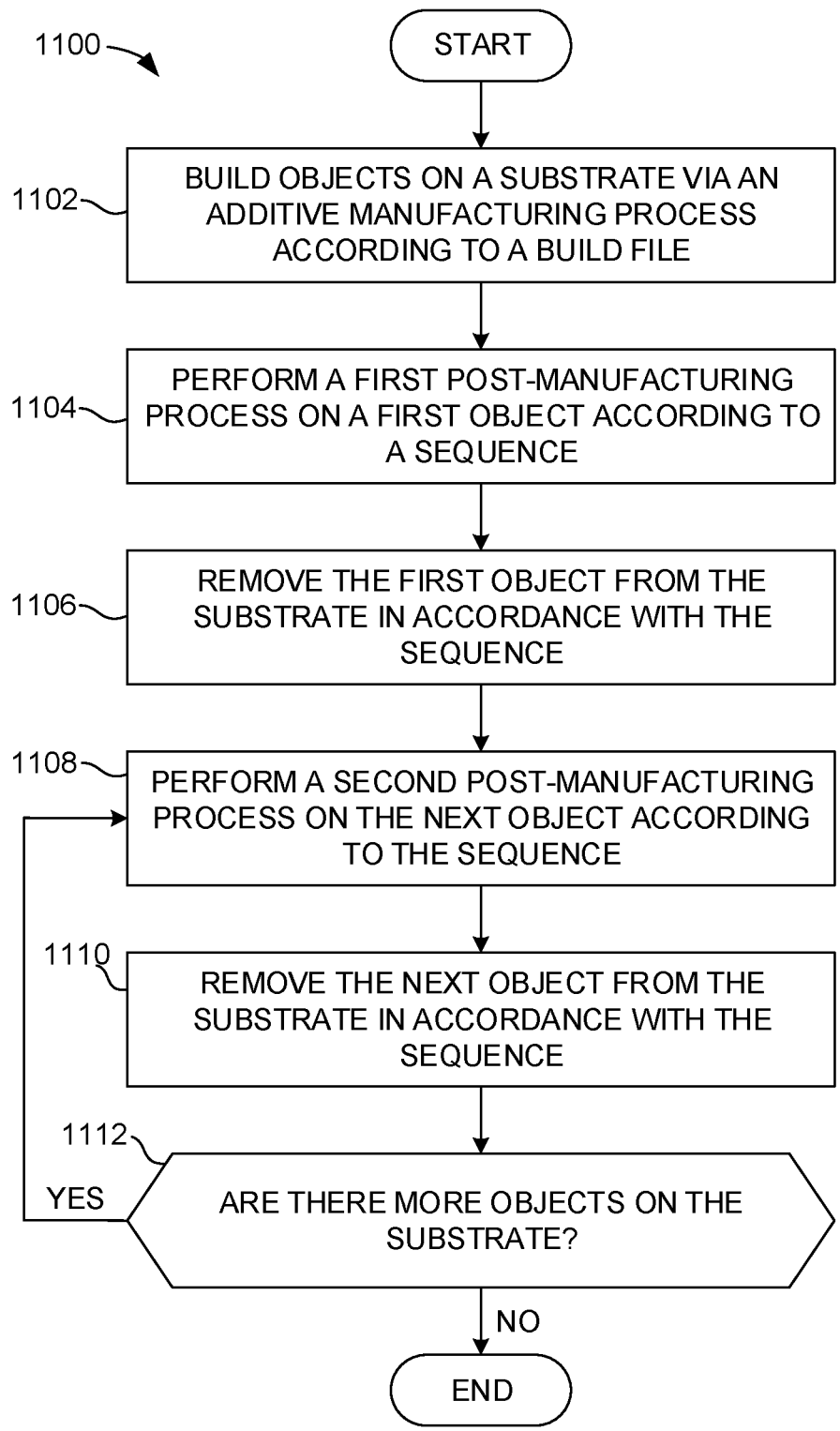
FIG. 11 is a flowchart representative of an example method that may be performed by one or more example machine(s) of the example automated machining system of FIG. 1 to build one or more objects according to a sequence of post-manufacturing process(es) and removal as determined by the example build file generator.

FIG. 11 is a flowchart 1100 representative of an example method that may be performed by an AM machine and one or more post-manufacturing machine(s) to build one or more objects according to a sequence as determined by the build file generator 110. The example process of FIG. 11 is described in connection with the example automated machining system 100 of FIG. 1 having the AM machine 102 and the post-manufacturing machine(s) 104. However, in other examples, the example process of FIG. 11 may be implemented in connection with other types of systems or manufacturing facilities having more or fewer AM machines and/or post-manufacturing machines.

At block 1102, the AM machine 102 builds the objects 116a-116n on the substrate 106 according to the build file 108, which defines the layout of the selected ones of the objects 116a-116n. At block 1104, one of the post-manufacturing machine(s) 104 (e.g., the CNC machine 400 of FIG. 4) performs a first post-manufacturing process on the first one of the objects 116a-116n in the sequence. The sequence may be part of the machining file 130 and/or the build file 108 and provided to the post-manufacturing machines(s) 104. The post-manufacturing process may include machining (e.g., via the CNC machine 400 of FIG. 4) the object, for example. In some examples, only one post-manufacturing process is performed on the first object in the sequence. In other examples, multiple post-manufacturing processes are performed on the first object in the sequence via the same post-manufacturing machine or different post-manufacturing machine(s).

After the post-manufacturing process(es) is/are performed on the first object in the sequence, the first object, at block 1106, is removed from the substrate 106 in accordance with the sequence. The first object may be removed from the substrate 106 using a slotting tool, for example. The first object may be removed from the substrate 106 using the same post-manufacturing machine. For example the CNC machine 400 that performed the first post-manufacturing process on the first object may also remove the first object from the substrate 106 using a slotting tool or milling tool. Thus, in some examples, the substrate 106 stays with the same machine that previously performed the post-manufacturing process at block 1104. In other examples, the removal operation is performed by a different post-manufacturing machine. Thus, in some examples, the substrate 106 may be transferred (e.g., via an automated device) to another machine for removing the first object.

At block 1108, one of the post-manufacturing machine(s) 104 (e.g., the CNC machine 400 of FIG. 4) performs a second post-manufacturing process on a second one of the objects 116a-116n, which is the next object in the sequence. Similar to the first object, one or more post-manufacturing processes may be performed on the second object by the same or different machines. At block 1110, the second object is removed from the substrate 106. Similar to the first object, the second object may be removed using a slotting tool. In other examples, another type of machine may be used to remove the second object.

At block 1112, the example method includes determining if there are more objects on the substrate to be processed and/or removed. If there are more objects, the example method returns to blocks 1108 and 1110, and one or more post-manufacturing processes are performed on the next object in accordance with the sequence and/or the object is removed in accordance with the sequence. The example process of blocks 1108-1112 may continue until all of the objects are processed and/or removed from the substrate 106. While in the illustrated example the objects are removed after the associated post-manufacturing process(es) is/are performed on the object, in other examples, the sequence may include performing one or more post-manufacturing process(es) on multiple ones of the objects before removing an object.

In some examples, an initial post-manufacturing process, which may occur before removing the first object at block 1106, includes spraying one or more of object(s) 116a-116n with a protective foam. The protective foam may be sprayed manually or with a machine, such as the machine 900 of FIG. 9. The protective foam may provide a cushioning layer to the object(s) 116a-116n to prevent damage the object(s) 116a-116n as they are removed from the substrate 106 and collected.

While the example processes of FIGS. 10 and 11 are described in connection with an AM type process that creates the objects on a substrate, the example processes may be similarly performed with other types of machining processes that can produce objects on a substrate in close proximity. For example, the objects may instead be built on a substrate using a high volume CNC machine or a casting process. The example layout and sequence determination and post-manufacturing process/removal process(es) disclosed herein can likewise be used to enable the parts to be produced in a more compact manner on the substrate and remain on the substrate during the post-manufacturing processes, similar to examples disclosed herein. Thus, the examples disclosed herein can be applied to other types of manufacturing processes other than AM.

Figure 12:
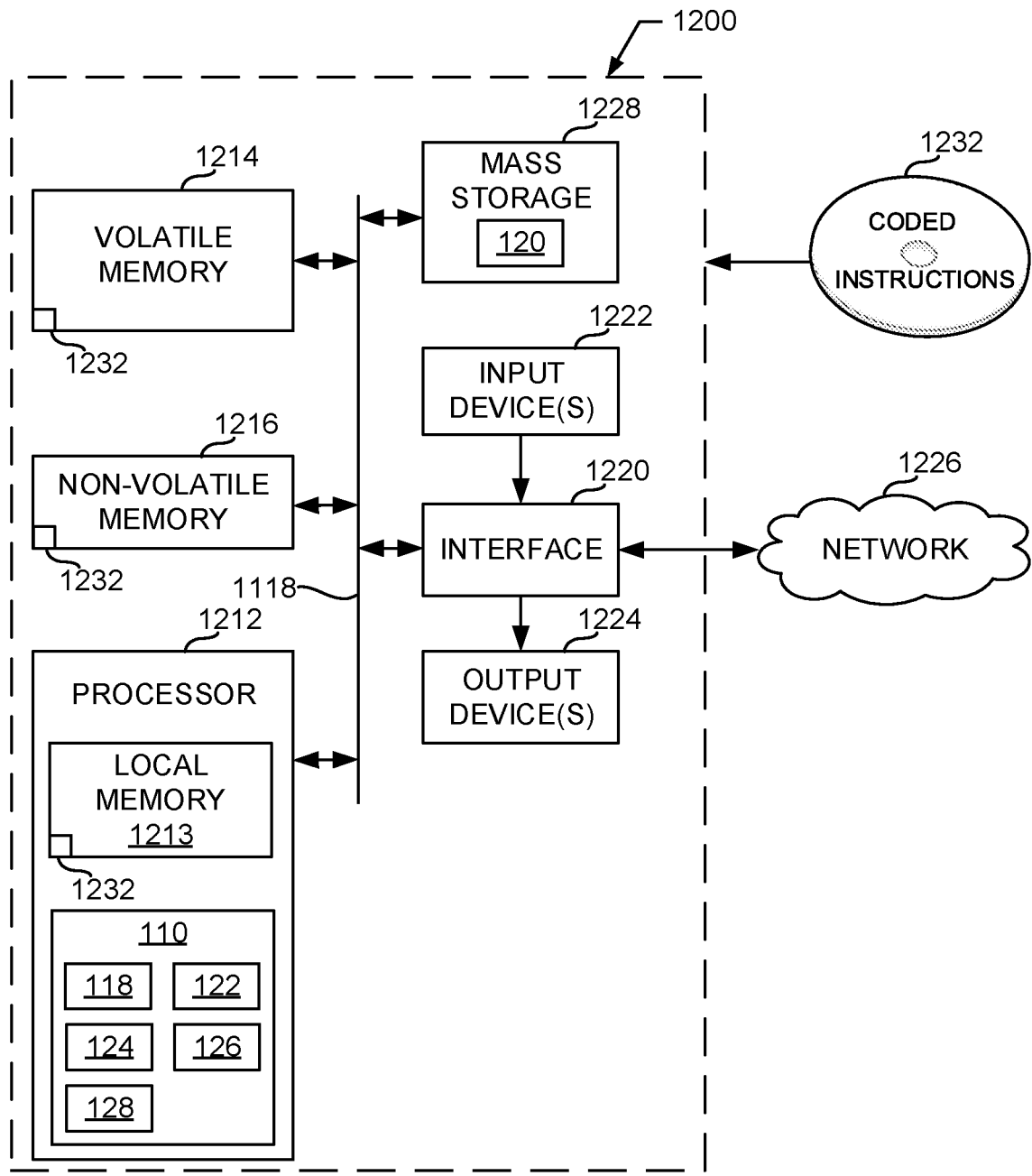
FIG. 12 is a processor platform structured to execute the example instructions of FIG. 10 to implement the example build file generator of FIG. 1.

FIG. 12 is a block diagram of an example processor platform 1200 structured to execute the instructions of FIG. 10 to implement the build file generator 110 of FIG. 1. The processor platform 1200 can be, for example, a server, a personal computer (e.g., the computer 112 of FIG. 1), a mobile device (e.g., a cell phone, a smart phone, a tablet such as an iPad™), a personal digital assistant (PDA), or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. The hardware processor may be a semiconductor based (e.g., silicon based) device. In this example, the processor 1212 may implement the example object file manager 118, the example volume definer 122, the example layout and sequence determiner 124, the example AM formatter 126, the example machining file generator 128 and/or, more generally, the example build file generator 110 of FIG. 1.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output device(s) 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives. In this example, the mass storage device 1228 may implement the memory 120.

The coded instructions 1232 of FIG. 10 may be stored in the mass storage device 1228, in the volatile memory 1214, in the non-volatile memory 1216, and/or on a removable tangible computer readable storage medium such as a CD or DVD.

From the foregoing, it will be appreciated that example methods, apparatus, systems, and articles of manufacture have been disclosed for generating a build file that defines a high-density layout of objects. As a result, more objects can be built or formed with an AM machine in a shorter period of time. Further, example methods, apparatus, systems, and articles of manufacture disclosed herein enable objects to remain fixed to a substrate during the one or more post-manufacturing process(es), which may be advantageous, for example, with objects having complex geometries that are not easily fixable to the post-manufacturing machines.

Although certain example methods, apparatus, systems, and articles of manufacture have been described herein, the scope of coverage of this patent is not limited thereto. On the contrary, this patent covers all methods, apparatus, systems, and articles of manufacture fairly falling within the scope of the appended claims either literally or under the doctrine of equivalents.

What is claimed is:

1. A non-transitory machine readable storage medium comprising instructions that, when executed, cause at least one machine to at least:
   identify a first toolpath volume associated with a first object to be formed via an additive manufacturing (AM) process, the first toolpath volume based on a first toolpath of a first post-manufacturing process to be performed on the first object;
   identify a second toolpath volume associated with a second object to be formed via the AM process, the second toolpath volume based on a second toolpath of a second post-manufacturing process to be performed on the second object;
   generate a build file for an AM machine based on the first toolpath volume and the second toolpath volume, the build file including a layout of the first and second objects to be formed on a substrate by the AM machine in which the first object is at least partially disposed in the second toolpath volume associated with the second object; and
   determine a sequence of post-manufacturing processes and removal of the first object and the second object, the sequence indicating the first post-manufacturing process is to be performed on the first object and the first object is to be removed from the substrate before the second post-manufacturing process is to be performed on the second object.

2. The non-transitory machine readable storage medium of claim 1, wherein the first post-manufacturing process and the second post-manufacturing process are a same type of post-manufacturing process.

3. The non-transitory machine readable storage medium of claim 1, wherein at least one of the first post-manufacturing process or the second post-manufacturing process is a subtractive manufacturing process.

4. The non-transitory machine readable storage medium of claim 1, wherein the first object and the second object have a same shape.

5. The non-transitory machine readable storage medium of claim 1, wherein the instructions, when executed, further cause the at least one machine to select, prior to generating the build file, the first and second objects from a plurality of objects to form on the substrate based on at least one of the first toolpath volume, the second toolpath volume, a promise date for at least one of the first or second objects, or a request date for at least one of the first or second objects.

6. The non-transitory machine readable storage medium of claim 1, wherein, according to the sequence, the first post-manufacturing process is to be performed on the first object while the first and second objects are fixed on the substrate.

7. The non-transitory machine readable storage medium of claim 1, wherein the instructions, when executed, cause the at least one machine to identify the first toolpath volume based on a first machining file associated with the first object and identify the second toolpath volume based on a second machining file associated with the second object.

8. The non-transitory machine readable storage medium of claim 1, wherein the instructions, when executed, cause the at least one machine to transmit the build file to the AM machine.

9. The non-transitory machine readable storage medium of claim 8, wherein the instructions, when executed, cause the at least one machine to:
   generate a machining file including the sequence; and
   transmit the machining file to one or more post-manufacturing machines used to perform the first and second post-manufacturing processes.

10. The non-transitory machine readable storage medium of claim 1, wherein the instructions, when executed, cause the at least one machine to select the first object and the second object from a plurality of objects to be built on the substrate.

11. The non-transitory machine readable storage medium of claim 10, wherein the instructions, when executed, cause the at least one machine to select the first object and the second object to build on the substrate based on sizes of the first and second objects, the first and second toolpath volumes, and a size for the substrate.

12. A build file generator comprising:
   an object file manager to:
      identify a first toolpath volume associated with a first object to be formed via an additive manufacturing (AM) process, the first toolpath volume based on a first toolpath of a first post-manufacturing process to be used on the first object;

identify a second toolpath volume associated with a second object to be formed via the AM process, the second toolpath volume based on a second toolpath of a second post-manufacturing process to be used on the second object;

a layout determiner to:

determine a layout of the first and second objects to be formed on a substrate by the AM process based on the first and second toolpath volumes, according to the layout, the first object is at least partially disposed within the second toolpath volume; and determine a sequence defining one or more post-manufacturing processes to be performed on the first object and the second object and removal of the first object and the second object from the substrate, the sequence indicating the first post-manufacturing process is to be performed on the first object and the first object is to be removed from the substrate before the second post-manufacturing process is to be performed on the second object; and an AM formatter to generate a build file based on the layout.

13. The build file generator of claim 12, wherein at least one of the first post-manufacturing process or the second post-manufacturing process is a subtractive manufacturing process.

14. A method of producing objects, the method comprising:

identifying a first toolpath volume associated with a first object based on a first toolpath of a first post-manufacturing process to be performed on the first object;

identifying a second toolpath volume associated with a second object based on a second toolpath of a second post-manufacturing process to be performed on the second object;

generating a build file based on the first toolpath volume and the second toolpath volume, the build file defining a layout of the first object and the second object to be formed on a substrate in which the first object is at least partially disposed in the second toolpath volume associated;

building, via an additive manufacturing (AM) machine, the first object and the second object on the substrate according to the build file;

performing the first post-manufacturing process on the first object while both the first and second objects are fixed on the substrate;

after performing the first post-manufacturing process on the first object, removing the first object from the substrate; and after removing the first object from the substrate, performing the second post-manufacturing process on the second object while the second object is fixed on the substrate.

15. The method of claim 14, wherein, according to the layout, the second object is not disposed in the first toolpath volume associated with the first object.

16. The method of claim 14, wherein the AM machine is a powder bed fusion machine.

17. The method of claim 14, further including, prior to removing the first object from the substrate, spraying at least one of the first object or the second object with a protective foam.

18. The method of claim 14, wherein the first post-manufacturing process is a subtractive manufacturing process.

19. The method of claim 18, wherein the first post-manufacturing process is performed by a computer numerical control (CNC) machine.

* * * * *